US012700127B2

(12) United States Patent
Qian et al.

(10) Patent No.: US 12,700,127 B2
(45) Date of Patent: *Aug. 4, 2026

(54) UAV CONTROL METHOD, DEVICE AND UAV

(71) Applicant: SZ DJI TECHNOLOGY CO., LTD., Shenzhen (CN)

(72) Inventors: Jie Qian, Shenzhen (CN); Zhengzhe Liu, Shenzhen (CN); Lei Pang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 110 days.

This patent is subject to a terminal disclaimer.

(21) Appl. No.: 18/920,216

(22) Filed: Oct. 18, 2024

(65) Prior Publication Data

US 2025/0045949 A1     Feb. 6, 2025

Related U.S. Application Data

(63) Continuation of application No. 16/934,910, filed on Jul. 21, 2020, now Pat. No. 12,125,229, which is a
(Continued)

(51) Int. Cl.
*G06T 7/70* (2017.01)
*B64C 39/02* (2023.01)
(Continued)

(52) U.S. Cl.
CPC .............. *G06T 7/70* (2017.01); *B64C 39/024* (2013.01); *B64D 47/08* (2013.01); *B64U 20/87* (2023.01);
(Continued)

(58) Field of Classification Search
CPC ............. G06T 7/70; G06T 2207/10032; G06T 2207/30196; G06V 20/13; G06V 20/17;
(Continued)

(56) References Cited

U.S. PATENT DOCUMENTS 9,758,246 B1     9/2017  Lema et al.
10,222,800 B2 *  3/2019  Wang .................... B64U 30/20
(Continued)

FOREIGN PATENT DOCUMENTS

CN          105518576 A     4/2016
CN          105677300 A     6/2016
(Continued)

OTHER PUBLICATIONS

The World Intellectual Property Organization (WIPO) International Search Report for PCT/CN2018/073803 Sep. 27, 2018 7 pages.
(Continued)

*Primary Examiner* — Aniss Chad
*Assistant Examiner* — Christine Nguyen Huynh
(74) *Attorney, Agent, or Firm* — Anova Law Group, PLLC

(57) ABSTRACT

A control method includes obtaining an image captured by a photographing device, determining a location of a target part of a target object in the image, controlling, based on at least the location of the target part, an unmanned aerial vehicle (UAV) to fly to an expected altitude with a non-zero horizontal distance with the target part of the target object, and in response to a detected landing command, controlling the UAV to initiate a landing process. The expected altitude is an altitude at which the target part is located.

20 Claims, 13 Drawing Sheets

Related U.S. Application Data continuation of application No. PCT/CN2018/073803, filed on Jan. 23, 2018.

(51) Int. Cl.

| | |
|---|---|
| *B64D 47/08* | (2006.01) |
| *B64U 10/10* | (2023.01) |
| *B64U 20/87* | (2023.01) |
| *B64U 50/13* | (2023.01) |
| *B64U 50/19* | (2023.01) |
| *B64U 101/30* | (2023.01) |
| *G06V 20/13* | (2022.01) |
| *G06V 20/17* | (2022.01) |
| *G06V 40/20* | (2022.01) |
| *B64U 10/14* | (2023.01) |

(52) U.S. Cl.
CPC ............. *B64U 50/13* (2023.01); *B64U 50/19* (2023.01); *G06V 20/13* (2022.01); *G06V 20/17* (2022.01); *G06V 40/28* (2022.01); *B64U 10/10* (2023.01); *B64U 10/14* (2023.01); *B64U 2101/30* (2023.01); *B64U 2201/20* (2023.01); *G06T 2207/10032* (2013.01)

(58) Field of Classification Search
CPC ...... G06V 40/28; G05D 1/0808; G05D 1/106; B64C 39/024; B64D 47/08; B64U 20/87; B64U 50/13; B64U 50/19; B64U 10/10; B64U 10/14; B64U 2101/30; B64U 2201/20
See application file for complete search history.

(56) References Cited

U.S. PATENT DOCUMENTS

| | | | |
|---|---|---|---|
| 2009/0222149 A1 | 9/2009 | Murray et al. | |
| 2012/0296497 A1 | 11/2012 | Lee et al. | |
| 2017/0308099 A1 * | 10/2017 | Kim ........................ | G01S 7/521 |
| 2018/0129212 A1 | 5/2018 | Lee et al. | |
| 2018/0173220 A1 | 6/2018 | Wang et al. | |

FOREIGN PATENT DOCUMENTS

| | | | | | |
|---|---|---|---|---|---|
| CN | 105807926 A | | 7/2016 | | |
| CN | 106094861 A | | 11/2016 | | |
| CN | 106200657 A | | 12/2016 | | |
| CN | 106249888 A | | 12/2016 | | |
| CN | 106339079 A | | 1/2017 | | |
| CN | 106377228 A | | 2/2017 | | |
| CN | 106444843 A | | 2/2017 | | |
| CN | 106708089 A | | 5/2017 | | |
| CN | 106843489 A | * | 6/2017 | ............ | G06F 3/017 |
| CN | 107203215 A | | 9/2017 | | |
| CN | 107239728 A | | 10/2017 | | |
| CN | 107463181 A | | 12/2017 | | |
| WO | 2017060782 A1 | | 4/2017 | | |

OTHER PUBLICATIONS

Y. Yu, X. Wang, Z. Zhong and Y. Zhang, "ROS-based UAV control using hand gesture recognition," 2017 29th Chinese Control And Decision Conference (CCDC), Chongqing, China, 2017, pp. 6795-6799 (Year: 2017).

* cited by examiner

Obtain an image captured by a photographing device          S201

Determine a location of a target object's hand in the image          S202

Determine location information of the target object's hand based on the location of the hand in the image          S203

Control the UAV based on the location information of the target object's hand          S204

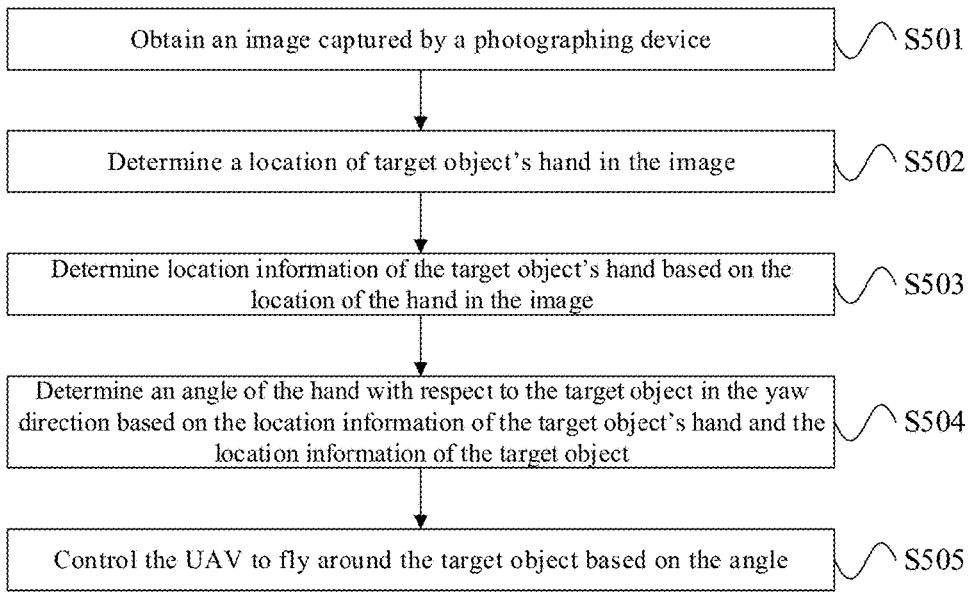

| Obtain an image captured by a photographing device | S501 |

| Determine a location of target object's hand in the image | S502 |

| Determine location information of the target object's hand based on the location of the hand in the image | S503 |

| Determine an angle of the hand with respect to the target object in the yaw direction based on the location information of the target object's hand and the location information of the target object | S504 |

| Control the UAV to fly around the target object based on the angle | S505 |

FIG. 9

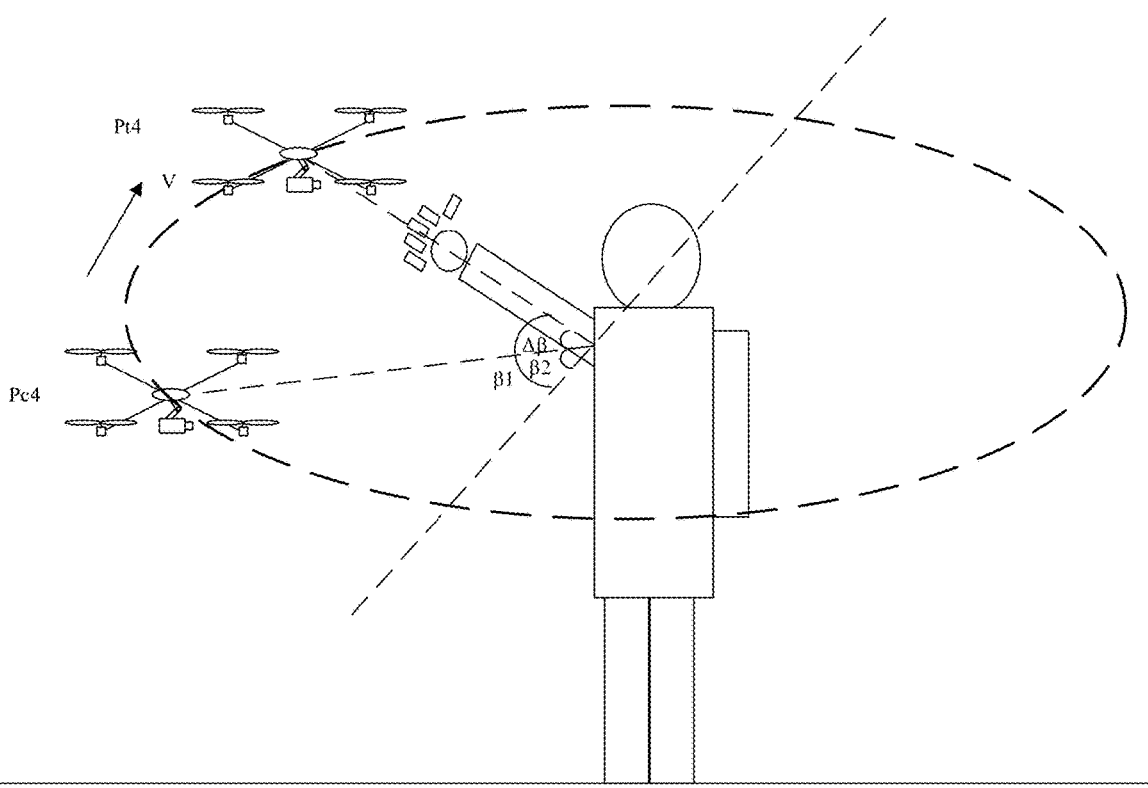

FIG. 10

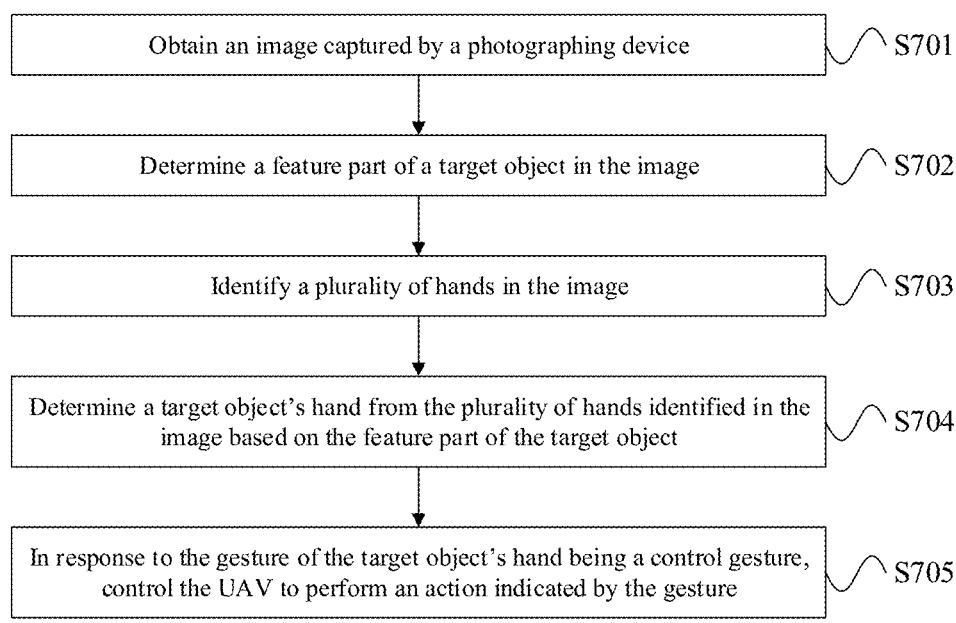

| Obtain an image captured by a photographing device | S701 |

| Determine a feature part of a target object in the image | S702 |

| Identify a plurality of hands in the image | S703 |

| Determine a target object's hand from the plurality of hands identified in the image based on the feature part of the target object | S704 |

| In response to the gesture of the target object's hand being a control gesture, control the UAV to perform an action indicated by the gesture | S705 |

FIG. 15

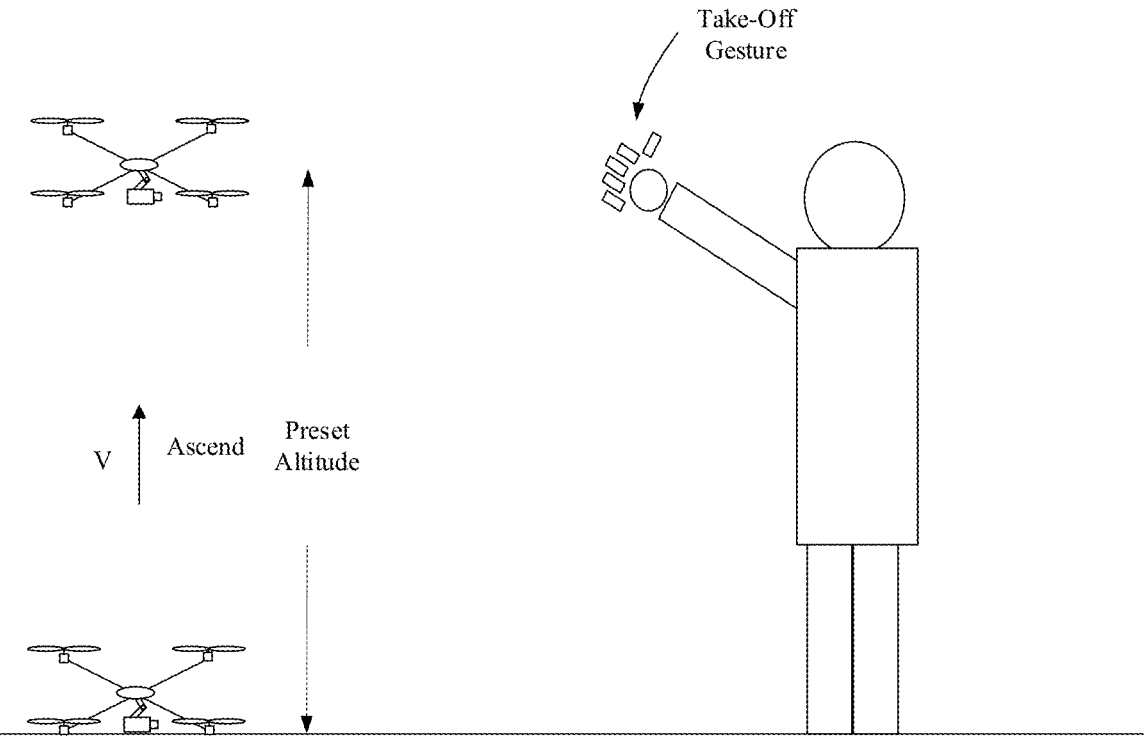

FIG. 16

UAV CONTROL METHOD, DEVICE AND UAV

CROSS-REFERENCE TO RELATED APPLICATION

This application is a continuation of application Ser. No. 16/934,910, filed on Jul. 21, 2020, which is a continuation of International Application No. PCT/CN2018/073803, filed Jan. 23, 2018, the entire contents of both of which are incorporated herein by reference.

TECHNICAL FIELD

The present disclosure relates to the field of unmanned aerial vehicle (UAV), and in particular relates to a UAV control method, device, and UAV.

BACKGROUND

As the application of UAVs becomes more and more widespread, the control methods of UAVs also become more and more diverse. The control methods start from using remote control handles to control UAVs at the beginning, and have slowly evolved to using touch screen devices such as mobile phones and tablet computers to control UAVs. However, these control methods of UAVs need to rely on additional equipment other than UAVs, which not only increase costs, but also highly demand users to learn to operate the additional equipment to control UAVs, and causes poor human-computer interactions.

SUMMARY

In accordance with the disclosure, there is provided a control method for UAV. The control method includes obtaining an image captured by a photographing device, determining a location of a target object hand in the image, determining location information of the hand of the target object based on the location of the hand in the image, and controlling the UAV based on the location information of the hand of the target object.

Also, in accordance with the disclosure, there is provided a control device for UAV. The control device includes a memory configured to store program code and a processor configured to execute the program code. When executed, the program code instructs the processor to: obtain an image captured by a photographing device, determine a location of a target object hand in the image, determine a location information of the hand of the target object based on the location of the hand in the image, and control the UAV based on the location information of the hand of the target object.

BRIEF DESCRIPTION OF THE DRAWINGS

FIG. 9 illustrates a fourth flowchart of a method for controlling a UAV according to some embodiment of the present disclosure;

FIG. 10 is a first schematic diagram of controlling a UAV to fly around a target object according to some embodiment of the present disclosure;

FIG. 15 is a sixth flowchart of a method for controlling a UAV according to some embodiment of the present disclosure;

FIG. 16 is a schematic diagram of controlling ascending of a UAV according to some embodiment of the present disclosure;

DETAILED DESCRIPTION OF THE EMBODIMENTS

Embodiments of the present disclosure provide a UAV control method, a device, and a UAV. The UAV may be a rotorcraft, for example, a rotorcraft propelled by multiple pushing devices through air, and the embodiments of the present disclosure are not limited thereto.

Figure 1:
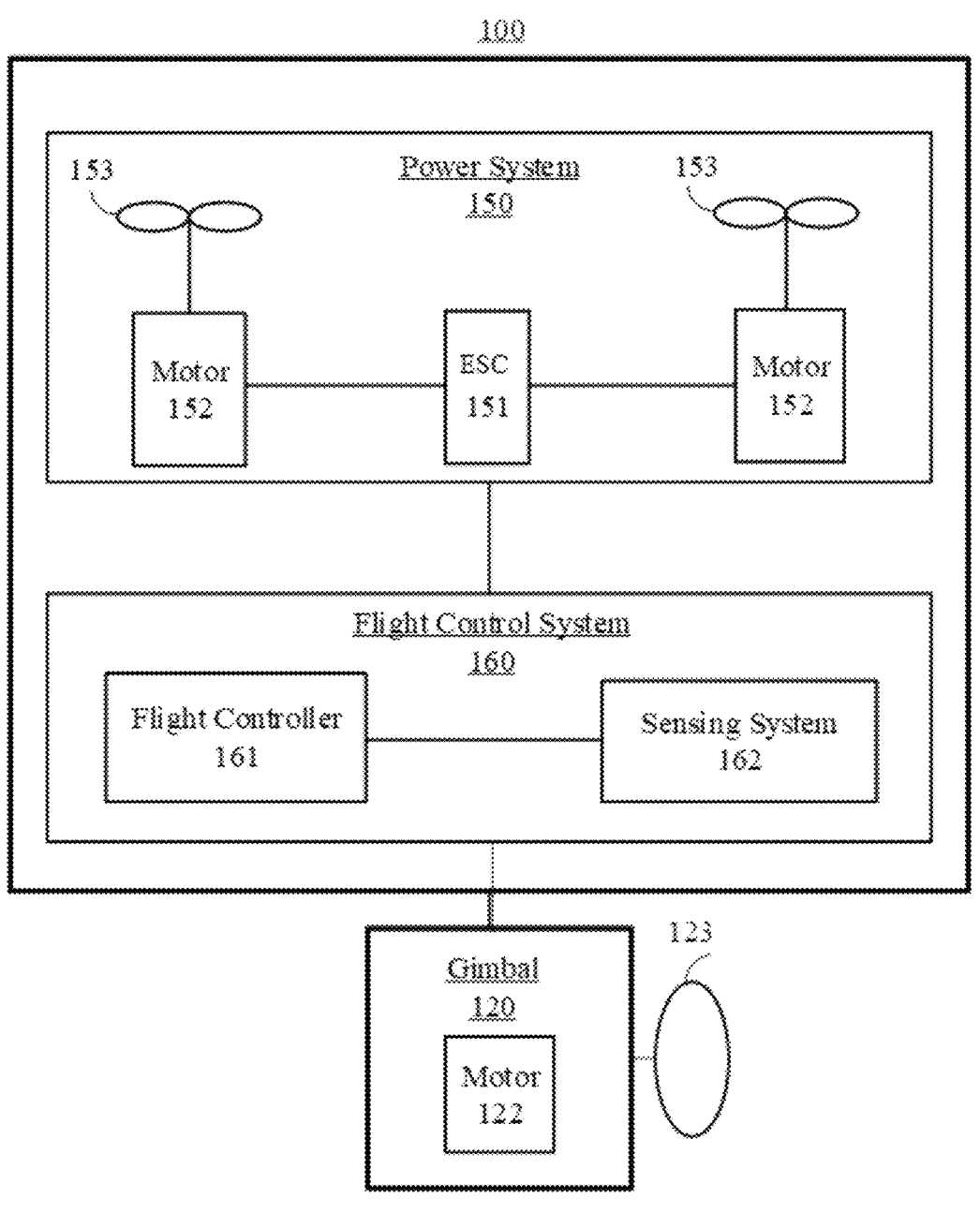
FIG. 1 is a first schematic diagram of a UAV according to some embodiment of the present disclosure.

FIG. 1 is a schematic configuration diagram of a UAV according to some embodiment of the present disclosure. This embodiment is described by taking a rotorcraft UAV as an example.

The UAV 100 may include a power system 150, a flight control system 160, and a frame.

The frame may include a body and a tripod (also called a descending gear). The body may include a center frame and one or more arms connected to the center frame. One or more arms extend radially from the center frame. The tripod is connected to the body, configured to support the UAV 100 during descending.

The power system 150 may include one or more electronic speed governors (referred to as ESGs) 151, one or more propellers 153, and one or more electric motors 152 corresponding to the one or more propellers 153, the electric motors 152 being connected between the electronic speed governor 151 and the propeller 153, the motor 152 and the propeller 153 being disposed on the arm of the UAV 100. The electronic speed governor 151 is configured to receive a driving signal generated by a flight control system 160 and supply driving current to the motor 152 based on the driving signal, to control a rotation speed of the motor 152. The motor 152 is configured to drive the propeller to rotate, so as to supply power for a flight of the UAV 100, and such power enables the UAV 100 to achieve movement in one or more degrees of freedom. In some embodiments, the UAV 100 may rotate about one or more rotation axes. For example, the rotation axes may include: a roll axis, a yaw axis, and a pitch axis. It should be understood that the motor 152 may be a DC motor or an AC motor. In addition, the motor 152 may be a brushless motor or a brushed motor.

The flight control system 160 may include a flight controller 161 and a sensing system 162. The sensing system 162 is configured to measure attitude information of the UAV, that is, location information and status information of the UAV 100 in space, such as a three-dimensional location, three-dimensional angle, three-dimensional velocity, three-dimensional acceleration, and three-dimensional angular velocity, etc. The sensing system 162 may include, e.g., at least one of: a gyroscope, an ultrasonic sensor, an electronic compass, an inertial measurement unit (IMU), a vision sensor, a global navigation satellite system, or a barometer. For example, the global navigation satellite system may be a Global Positioning System (GPS). The flight controller 161 is configured to control the UAV 100. For example, the flight controller 161 may control the UAV 100 based on the attitude information measured by the sensing system 162. It should be understood that the flight controller 161 may control the UAV 100 based on pre-programmed instructions, and may also control the UAV 100 through a shooting screen.

The UAV 100 further includes a gimbal 120, and the gimbal 120 may include a motor 122. The gimbal is configured to carry a photographing device 123. The flight controller 161 may control the movement of the gimbal 120 through the motor 122. Optionally, as another embodiment, the gimbal 120 may further include a controller configured to control the movement of the gimbal 120 by controlling the motor 122. It should be understood that the gimbal 120 may be independent of, or part of, the UAV 100. It should be understood that the motor 122 may be a DC motor or an AC motor. In addition, the motor 122 may be a brushless motor or a brushed motor. It should also be understood that the gimbal can be located on top of the UAV or at a bottom of the UAV.

The photographing device 123 may be, for example, a device for capturing an image, such as a camera or a video camera. The photographing device 123 may communicate with the flight controller and perform photographing under control of the flight controller. The flight controller may also control the UAV 100 based on the image captured by the photographing device 123. The photographing device 123 of this embodiment includes at least a photosensitive component. The photosensitive element is, for example, a complementary metal oxide semiconductor (CMOS) sensor or a charge-coupled device (CCD) sensor. It can be understood that the photographing device 123 can also be directly fixed on the UAV 100, so that the gimbal 120 may be omitted.

It should be understood that the above-mentioned naming of each component of the UAV is for identification purposes only, and should not be construed as limiting the embodiments of the present disclosure.

Figure 2:
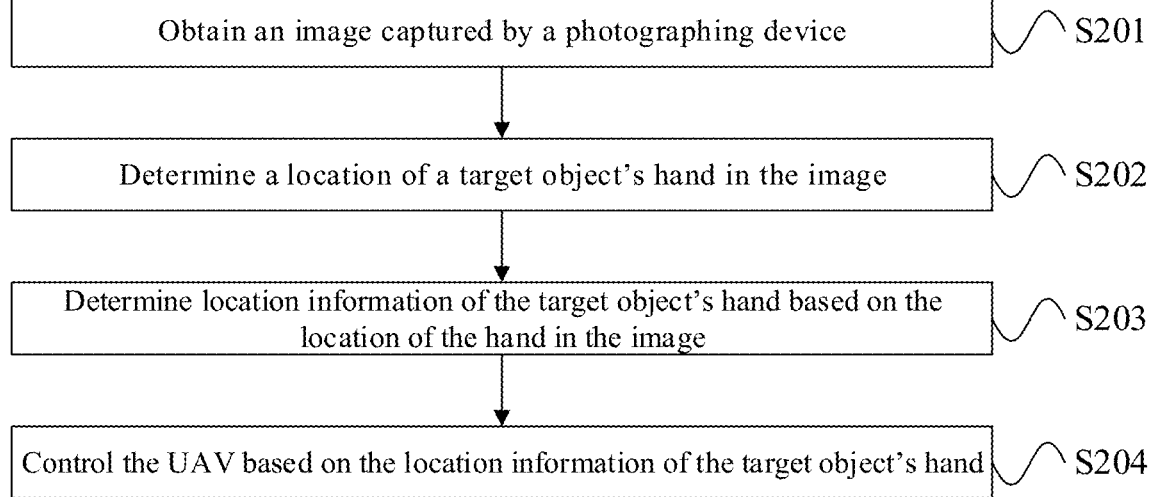
FIG. 2 illustrates a first flowchart of a method for controlling a UAV according to some embodiment of the present disclosure.

FIG. 2 illustrates a first flowchart of a method for controlling a UAV according to some embodiment of the present disclosure. As shown in FIG. 2, the method in this embodiment may include:

S201: Obtaining an image captured by a photographing device.

The photographing device is an important part of the UAV, and may be configured to capture images around the UAV. When the UAV enters a gesture control mode, the UAV may be controlled according to the images captured by the photographing device. After the photographing device captures an image, the UAV obtains the image captured by the photographing device. The photographing device may be the photographing device 123 of the foregoing part, and details are not described herein again.

S202: Determining a location of a hand of a target object in the image.

Figure 3:
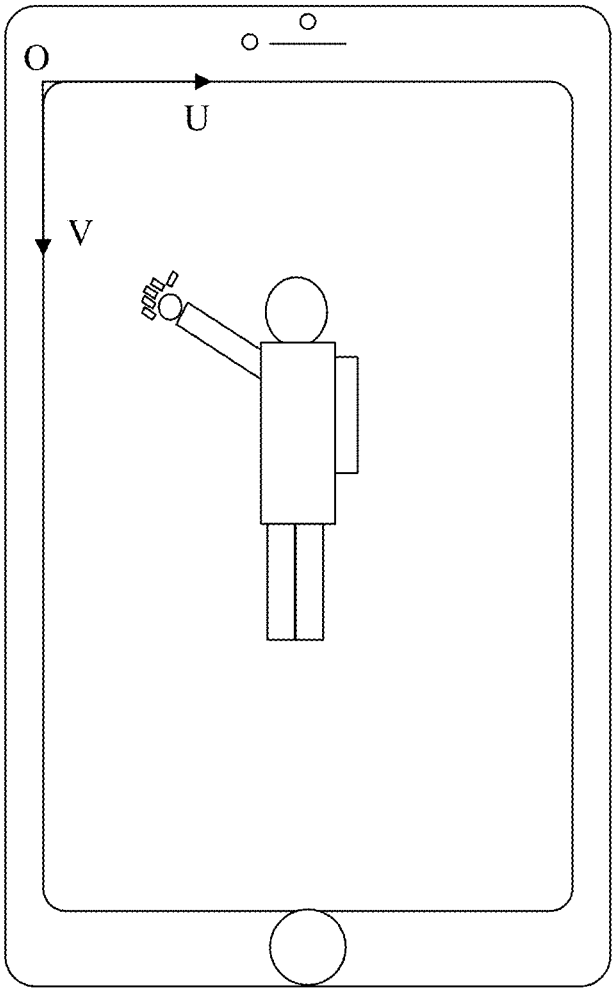
FIG. 3 is a schematic diagram of a target object in an image captured by a photographing device according to some embodiment of the present disclosure.

In this embodiment, the UAV is mainly controlled according to the hand in the image. A user may be located where the photographing device can record. The user may be called the target object. The image captured by the photographing device contains the target object. Therefore, in this embodiment, the location of the target object's hand in the image is determined after the photographing device captures the image, and the location can be represented by pixel coordinates in an image coordinate system, UOV. FIG. 3 is a schematic diagram of a target object in an image captured by a photographing device according to some embodiment of the present disclosure. As shown in FIG. 3, an upper left corner of the image can be set as an origin (0,0), and a length and a width of the image can be represented by pixel numbers. Based on this, the pixel coordinates of the target object's hand in the image can be determined. After obtaining the image of the target object captured by the photographing device, the target object's hand can be identified through a neural network that has been trained to recognize the hand. Specifically, the neural network can return to the location of the target object's hand in the image. In some cases, the neural network can return to the coordinates of the upper left corner or lower right corner of an image area corresponding to the target object's hand in the image.

In this embodiment, after entering the gesture control mode, if more than one person is captured in the image, a person closest to a center of the image may be determined as the target object.

S203: Determining location information of the target object's hand based on the location of the hand in the image.

In this embodiment, after determining the location of the target object's hand in the image, the location information of the target object's hand is determined according to the location of the hand in the image. The location information may be represented by three-dimensional coordinates (x, y, z). The three-dimensional coordinates may be, for example, coordinates in a navigation coordinate system of a UAV, and an origin O in the navigation coordinate system may be a take-off point of the UAV. A positive axis of an X axis of the navigation coordinate system points to the North, a positive axis of a Y axis of the navigation coordinate system points to the East, and a Z axis of the navigation coordinate system is perpendicular to the XOY plane away from the ground. In some embodiments, the three-dimensional coordinates may also be coordinates in other coordinate systems, which are not specifically limited herein.

S204: Controlling the UAV based on the location information of the target object's hand.

In this embodiment, after determining the location information of the target object's hand, the UAV is controlled based on the location information of the hand of the target object. For example, the UAV may be controlled to perform various flight operations: a flying altitude of the UAV may be controlled; or, the UAV may be controlled to fly around the target object; or, the UAV may be controlled to fly away from or toward the target object. The flight trajectories of the UAV and the functions implemented by the UAV can be different under different flight operations. The different location information of the target object's hand may correspond to different flight operations. Therefore, the target object may control the UAV to perform different flight operations by controlling the hand to be different locations. In this embodiment, the UAV can be controlled based on the location information of the hand of the target object.

In the method for controlling a UAV provided by this embodiment, a location of a hand of a target object in an image is determined by obtaining an image captured by a photographing device; the location information of the target object's hand is determined based on the location of the hand in the image; and the UAV is controlled based on the location information of the hand of the target object. Therefore, in this embodiment, the UAV can be controlled according to the target object's hand in the image captured by the photographing device, which avoids the situation that the user must operate a control device to control the UAV, and overcomes the drawback that the user cannot control the UAV due to unfamiliarity with the control device. The control mode and operation process for controlling the UAV may be simplified, thereby improving the efficiency of controlling the UAV and enhancing the entertainment of human-machine interaction.

In some embodiments, a possible implementation manner of the above S203 is: Based on the location of the hand in the image, an attitude of the gimbal that carries the photographing device, a horizontal distance between the target object and the UAV, and the location information, the location information of the target object's hand is determined. The attitude of the gimbal that carries the photographing device is determined by an attitude of the photographing device, that is, the attitude angle of the photographing device such as a pitch angle and a yaw angle, are determined. Therefore, different attitudes of the gimbal that carries the photographing device will also cause the hand location information of the target object to be different. A horizontal distance between the hand and the UAV is determined by a horizontal distance between the target object and the UAV, and accordingly, the location information of the hand is affected. Therefore, different horizontal distances between the target object and the UAV will also cause the location information of the target object's hand to be different. In addition, in this embodiment, the location information of the target object's hand is obtained by referring to the location information of the UAV. The location information of the UAV can be obtained by a location sensor configured on the UAV, and the location sensor can be a GPS receiver or a Beidou receiver. In some cases, the location sensor may also include an inertial measurement unit, a vision sensor, etc. In summary, in this embodiment the location information of the target object's hand is accurately determined based on the location of the hand in the image, the attitude of the gimbal that carries the photographing device, the horizontal distance between the target object and the UAV, and the location information of the UAV.

Specifically, in this embodiment, an orientation of the hand with respect to the UAV is first determined based on the location of the hand in the image and the attitude of the gimbal that carries the photographing device; and then the location information of the target object's hand is determined based on the horizontal distance between the target object and the UAV and the location information of the UAV. An angle of field of view (FOV) of the photographing device is known, and an angle of the hand relative to an optical axis of the photographing device can be determined based on the location of the hand in the image. For example, if the hand is in the center of the image, an angle of the hand relative to the optical axis of the photographing device is 0. If the FOV of the photographing device is 20 degrees in the horizontal direction, and if the hand is at far left of the image, a horizontal angle of the hand relative to the optical axis of the photographing device is 10 degrees. It is similar in vertical direction, and the details are not described herein again. Moreover, an orientation of the optical axis of the photographing device is determined by the attitude of the gimbal of the photographing device, in combination with the angle of the hand relative to the optical axis of the photographing device and the orientation of the optical axis, so that the orientation of the hand relative to the UAV can be obtained. The horizontal distance between the hand and the UAV can be obtained based on the horizontal distance between the target object and the UAV. For example, the horizontal distance between the target object and the UAV may be subtracted by an empirical value (such as 0.65 meters), to obtain the horizontal distance between the hand and the UAV. Based on the obtained orientation, the distance between the hand and the UAV, and the location information of the UAV, the location information of the hand can be determined.

In some embodiments, determining the horizontal distance between the target object and the UAV may be achieved by one or more of the methods described below.

One feasible method includes determining the location of feet of the target object in the image; determining an orientation of the feet of the target object with respect to the UAV based on the location information of the feet in the image and the attitude of the gimbal that carries the photographing device; determining an angle of the target object's feet relative to the UAV in a pitch direction based on the orientation; then obtaining an altitude value measured by a distance sensor configured on the UAV; and determining the horizontal distance between the target object and the UAV based on the angle in the pitch direction and the altitude value measured by the distance sensor.

Another feasible method includes determining the locations of the feet and head of the target object in the image, and the attitude of the gimbal that carries the photographing device to determine the orientation of the feet and the head of the target object relative to the UAV; determining the feet of the target object and the angle of the feet relative to the UAV in the pitch direction based on the orientation; setting an experience value as the altitude of the target object, e.g., 1.75 m; and determining the horizontal distance between the target object and the UAV based on the angle of the feet and head of the target object relative to the UAV in the pitch direction and the set altitude of the target object.

It can be understood that the horizontal distance between the target object and the UAV may be a horizontal distance obtained by combining the horizontal distance determined by the above two feasible methods.

In some embodiments, the above S204 may be: Controlling the flying altitude of the UAV based on the location information of the hand of the target object, e.g., controlling the flying altitude of the UAV to increase or decrease.

In a possible implementation manner of this embodiment, the angle of the hand relative to the UAV in the pitch direction may be determined based on the location information of the target object's hand and the location information of the UAV according to the above S203; then the flying altitude of the UAV is determined based on the above angle.

Figure 4:
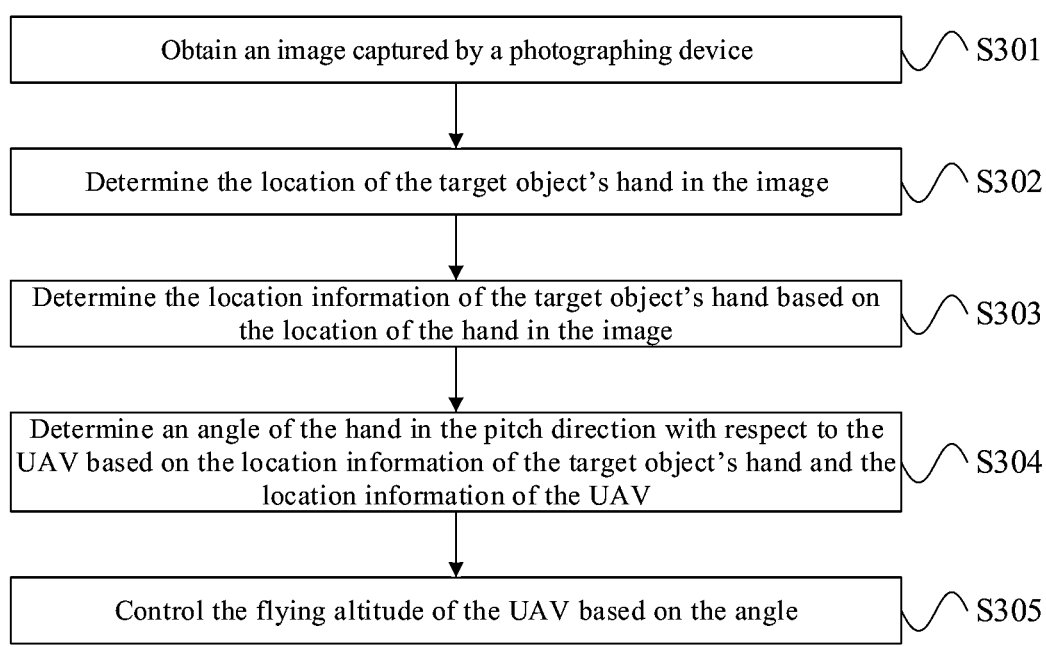
FIG. 4 illustrates a second flowchart of a method for controlling a UAV according to some embodiment of the present disclosure.

Based on the location information of the target object's hand and the location information of the UAV, the angle of the hand relative to the UAV in the pitch direction can be determined. FIG. 4 illustrates a second flowchart of a method for controlling a UAV according to some embodiment of the present disclosure. As shown in FIG. 4, the method in this embodiment takes controlling the flying altitude of the UAV based on the location information of the hand as an example. The method of this embodiment may include:

S301: Obtaining an image captured by a photographing device.

S302: Determining the location of the target object's hand in the image.

S303: Determining the location information of the target object's hand based on the location of the hand in the image.

For a specific implementation process of S303 in this embodiment, reference may be made to the related description in the embodiment shown in FIG. 2, and details are not described herein again.

S304: Determining an angle of the hand in the pitch direction with respect to the UAV based on the location information of the target object's hand and the location information of the UAV.

S305: Controlling the flying altitude of the UAV based on the angle.

Figure 5:
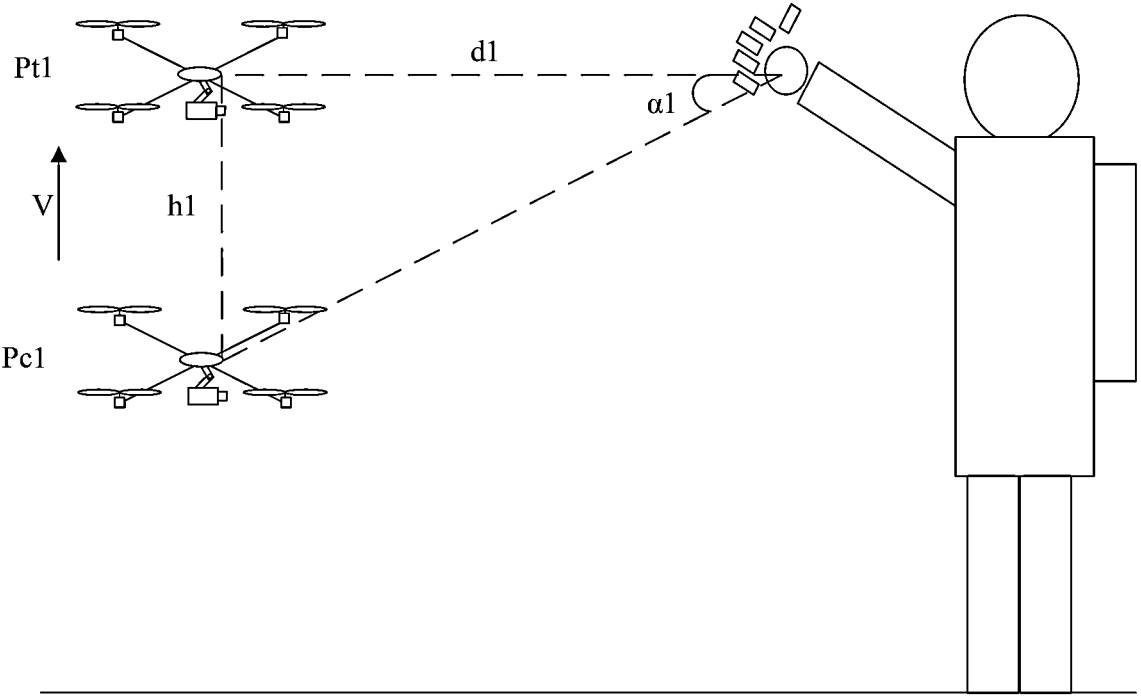
FIG. 5 is a first schematic diagram of controlling an altitude of a UAV according to some embodiment of the present disclosure.

In this embodiment, after determining the location information of the target object's hand, the angle of the hand relative to the UAV in the pitch direction is determined based on the location information of the target object's hand and the location information of the UAV, then an expected altitude of the UAV is determined based on the angle, and the UAV is controlled to fly to the expected altitude. An expected altitude of the UAV can be determined based on the angle and the horizontal distance between the target object and the UAV. For example, the horizontal distance between the target object and the UAV may be subtracted by an empirical value to obtain the target. The expected altitude of the UAV is determined based on the angle and the horizontal distance between the target object's hand and the UAV. The expected altitude of the UAV may be at the same altitude as the hand of the target object. FIG. 5 is a first schematic diagram of controlling an altitude of a UAV according to some embodiment of the present disclosure. As shown in FIG. 5, based on the location information of the target object's hand and the location information of the UAV, the angle of the target object's hand relative to the UAV in the pitch direction is α1, and the horizontal distance between the target object and the UAV is D1, then the horizontal distance between the target object's hand and the UAV, d1, may be obtained, and d1=D1−0.65 m. In addition, a current altitude of the UAV is Pc1. As shown in FIG. 5, an altitude difference, h1, between the current altitude of the UAV, Pc1, to the expected altitude, Pt1, may be obtained, where h1=d1*tan α1. Accordingly, the expected altitude of the UAV, Pt1=Pc1+h1, may be obtained. As shown in FIG. 5, in this embodiment the UAV may be controlled to fly to the same altitude as the hand.

In some embodiments, when a state parameter of the target object satisfies a first preset requirement, the above-mentioned S304 is performed. A state parameter of the target object satisfies a first preset requirement includes: a size ratio of the target object in the image is greater than or equal to a preset first ratio threshold; and/or, the distance between the target object and the UAV is less than or equal to a preset first distance. In this embodiment, it can be determined whether the size ratio of the target object in the image is smaller than the preset first ratio threshold. When the size ratio of the target object in the image is greater than or equal to the preset first ratio threshold, the above S304 is performed. The larger the size ratio of the target object in the image is, the shorter the distance between the target object and the UAV is. It can also be determined whether the distance between the target object and the UAV is greater than a preset first distance, and when the distance between the target object and the UAV is less than or equal to the preset first distance, the above S304 is performed. The distance between the target object and the UAV may be obtained by a binocular camera configured on the UAV for distance measurement. Therefore, when the state parameter of the target object satisfies the first preset requirement, it is indicated that the distance between the target object and the UAV is short and the target object is in a near-field state. At this time, the UAV may accurately obtain the angle of the hand relative to the UAV in the pitch direction, to precisely control the flying altitude of the UAV.

In this embodiment, the above solution is implemented to control the flying altitude of the UAV by recording images, which avoids the situation that the user must operate a control device to control the UAV, and overcomes the drawback that the user cannot control the UAV due to unfamiliarity with the control device. The control mode and operation process for controlling the UAV may be simplified, thereby improving the efficiency of controlling the UAV and enhancing the entertainment of human-machine interaction.

Figure 6:
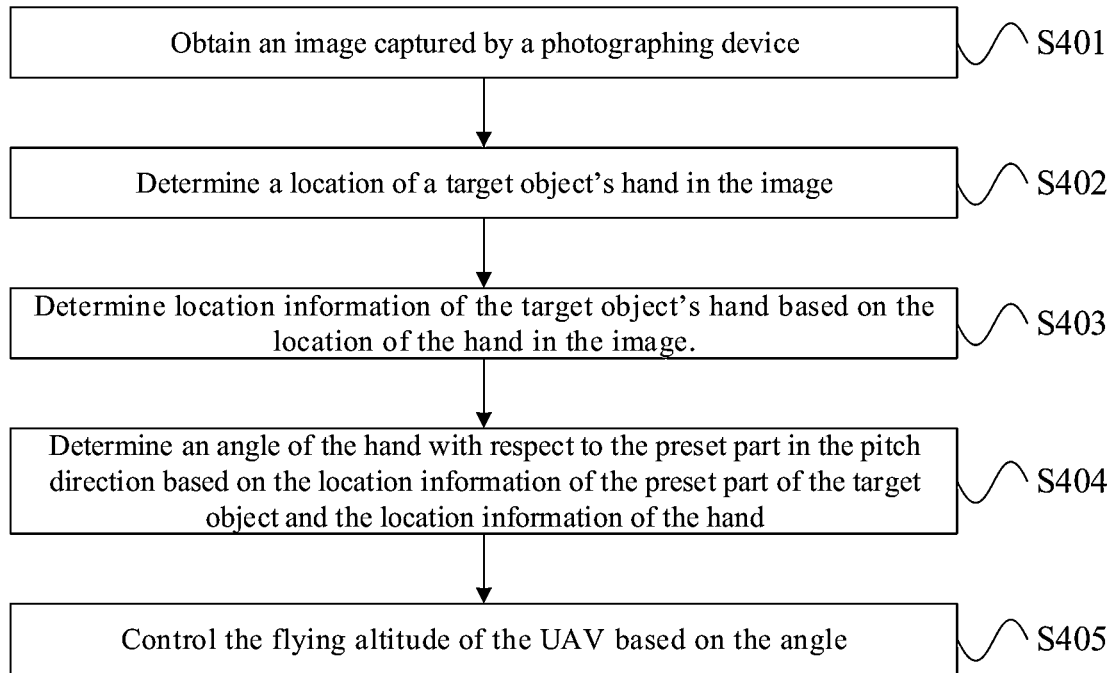
FIG. 6 illustrates a third flowchart of a method for controlling a UAV according to some embodiment of the present disclosure.

FIG. 6 illustrates a third flowchart of a method for controlling a UAV according to some embodiment of the present disclosure. As shown in FIG. 6, the method in this embodiment takes controlling the flying altitude of the UAV based on the location information of the hand as an example. The method of this embodiment may include:

S401: Obtaining an image captured by a photographing device.

S402: Determining a location of a target object's hand in the image.

S403: Determining location information of the target object's hand based on the location of the hand in the image.

For the specific implementation process of S403 in this embodiment, reference may be made to the related description in the embodiment shown in FIG. 2, and details are not described herein again.

S404: Determining an angle of the hand with respect to the preset part in the pitch direction based on the location information of the preset part of the target object and the location information of the hand.

S405: Controlling the flying altitude of the UAV based on the angle.

In this embodiment, after determining the location information of the target object's hand, the angle of the hand with respect to the preset position in the pitch direction is determined based on the location information of the target object's hand and the location information of the preset position of the target object, then the expected altitude of the UAV is determined based on this angle, and the UAV is controlled to fly to the expected altitude.

The preset part may be, for example, at least one part of: a head, a shoulder, or a chest. The location information of the preset part of the target object can be determined based on the location information of the target object. Taking the preset part being a head as an example, the head may be set as a top fifth of the target object, so that the location information of the top fifth of the target object is determined based on the location information of the target object.

In some embodiments, after obtaining the image captured by the photographing device, the location of the target object in the image is also determined, then the location information of the target object is determined based on the location information of the target object in the image. Specifically, in this embodiment, the location information of the target object may be determined based on the location of the target object in the image, the attitude of the gimbal that carries the photographing device, the horizontal distance between the target object and the UAV, and the location information of the UAV. The process of determining the location information of the target object is similar to the process of determining the location information of the hand, and details are not described herein again.

The expected altitude of the UAV may be determined based on the angle and the horizontal distance between the target object and the UAV, for example, the expected altitude of the UAV may be determined based on the angle and the horizontal distance between the target object and the UAV. For convenience of explanation, a head being the preset part is taken as an example for description.

Figure 7:
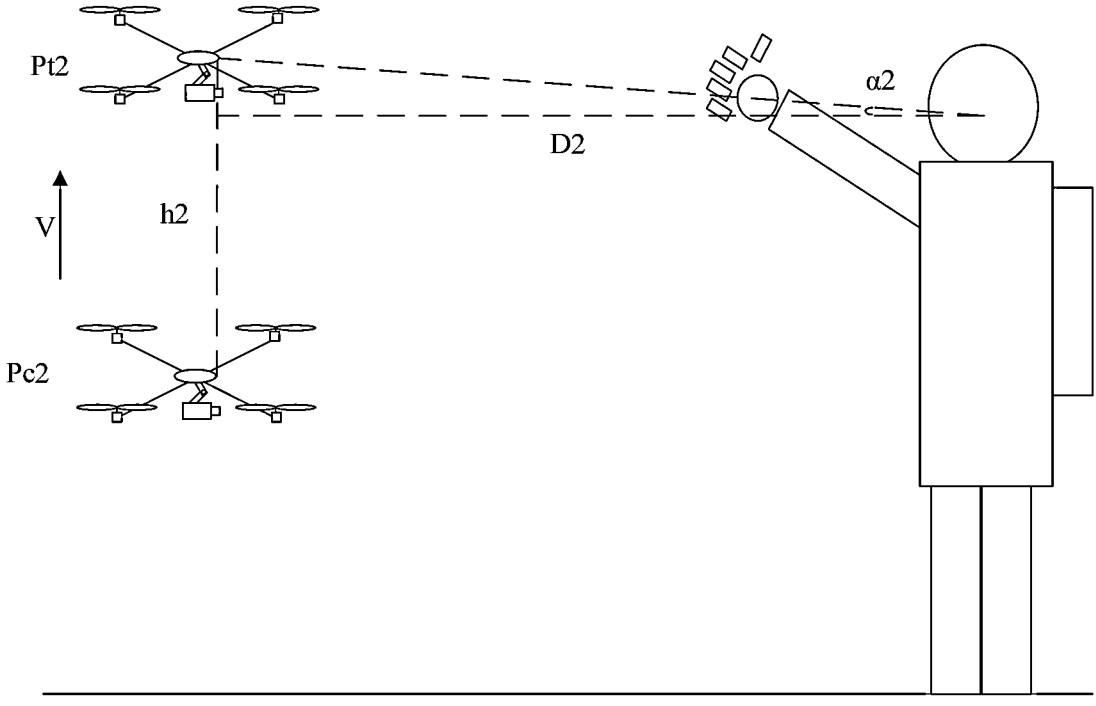
FIG. 7 is a second schematic diagram of controlling an altitude of a UAV according to some embodiment of the present disclosure.

In an implementation manner, FIG. 7 is a second schematic diagram of controlling an altitude of a UAV according to some embodiment of the present disclosure. As shown in FIG. 7, based on the location information of the target object's hand and the location of the preset part of the target object, an angle of the target object's hand relative to the preset position in the pitch direction is $\alpha2$, where a horizontal distance between the target object and the UAV is D2, and an altitude difference between the expected altitude of the UAV and the target object's preset part, D2*tan $\alpha2$, can be obtained. Moreover, the altitude difference between a current altitude Pc2 of the UAV and a preset part of the target object is $\Delta h$. The altitude difference between the expected altitude Pt2 and the expected altitude h2 can be obtained from FIG. 7, where h2=$\Delta h$+D2*tan $\alpha2$. Therefore, the expected altitude of the UAV can be obtained as Pt2=Pc2+h2. Accordingly, from FIG. 7, in this embodiment the UAV to fly can be controlled to fly in the same line as the target object's hand and the preset location.

Figure 8:
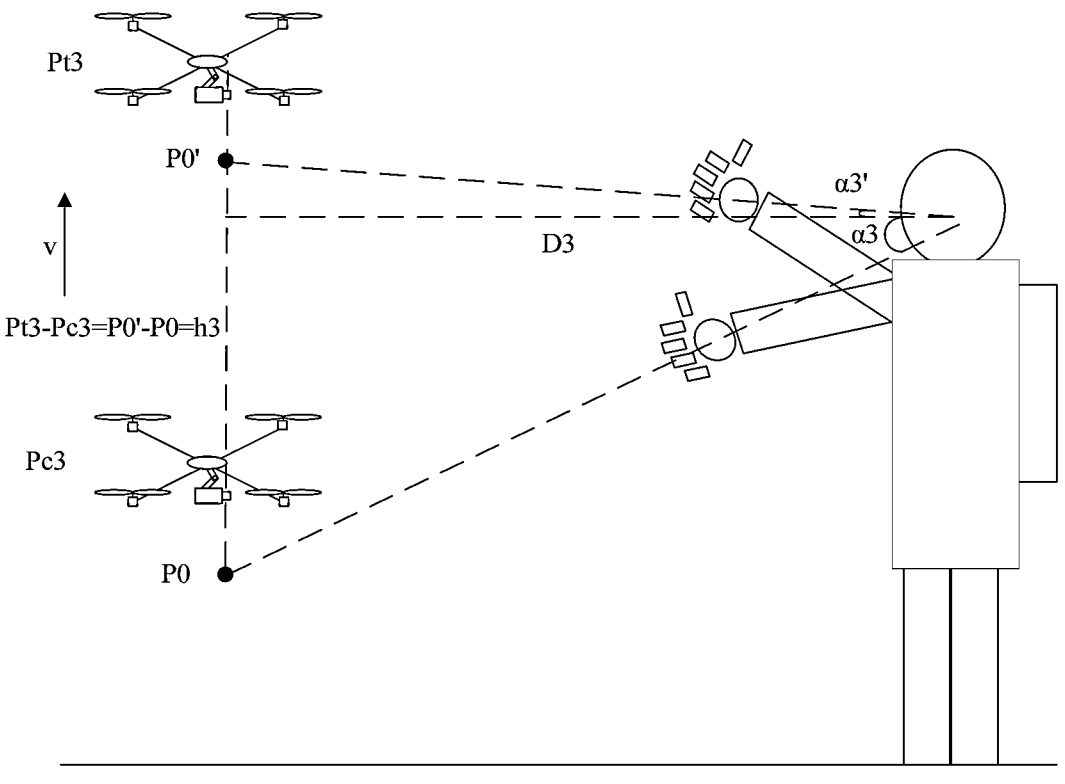
FIG. 8 is a third schematic diagram of controlling an altitude of a UAV according to some embodiment of the present disclosure.

In another implementation, the flying altitude of the UAV can be controlled based on the movement of the hand. FIG. 8 is a third schematic diagram of controlling an altitude of a UAV according to some embodiment of the present disclosure. As shown in FIG. 8, an angle of the target object's hand relative to the preset part in the pitch direction, $\alpha3$, may be determined based on the location information of a target object before movement and the location information of the preset part of the target object. Based on the location information of the target object's hand after the movement and the location information of the preset part of the target object, an angle of the target object's hand relative to preset part in the pitch direction, $\alpha3'$, may be determined. Therefore, an angular change amount of the target object's hand relative to the preset part in the pitch direction is $\alpha3+\alpha3'$. It should be noted that if the hand is located below or above the preset part both before and after the movement, and the angular change amount is $|\alpha3-\alpha3'|$. A horizontal distance between the target object and the UAV is D3. Therefore, based on the angular change amount and the horizontal distance between the target object and the UAV, an altitude difference between a P0 which represents an intersection point of a line segment connecting the hand and the target object before the movement in a vertical direction (Z coordinate) where the UAV is located, and a P0' which represents an intersection point of a line segment connecting the hand and the target object after the movement in the vertical direction of the UAV, is, h3=P0'−P0. The altitude difference h3 is regarded as an altitude difference between the expected altitude Pt3 of the UAV and the current altitude Pc3 of the UAV. Therefore, the expected altitude of the UAV can be obtained as Pt3=Pc3+h3, where, as shown in FIG. 8, h3=D2*(tan $\alpha3$+tan $\alpha3'$), and accordingly, Pt3=Pc3+D2*(tan $\alpha3$+tan $\alpha3'$). Accordingly, based on FIG. 8, in this embodiment, the flying altitude of the UAV may be controlled based on the projection change in the vertical direction of the UAV resulting from the altitude change of the hand and accordingly, based on the altitude change in the vertical direction of the UAV.

In some embodiments, when the state parameter of the target object satisfies a second preset requirement, the above S404 is performed. The state parameter of the target object satisfies a second preset requirement includes: a size ratio of the target object in the image is smaller than or equal to a preset second ratio threshold; and/or, the distance between target object and the UAV is greater than or equal to a preset second distance. In this embodiment, it can be determined whether the size ratio of the target object in the image is greater than a preset second ratio threshold. When the size ratio of the target object in the image is less than or equal to the preset second ratio threshold, the foregoing described S404 is performed. The smaller the proportion of the size of the target object in the image is, the longer the distance between the target object and the UAV is. It may also be determined whether the distance between the target object and the UAV is less than a preset second distance, and when the distance between the target object and the UAV is greater than or equal to the preset second distance, the above S404 is performed. Therefore, when the state parameter of the target object satisfies the second preset requirement, it is indicated that the distance between the target object and the UAV is long and the target object in a far-field state. At this time, the UAV can accurately obtain the angle of the hand relative to the preset part of the target object in the pitch direction, to precisely control the flying altitude of the UAV.

In some embodiments, the above-mentioned preset second ratio threshold may be equal to the above-mentioned preset first ratio threshold. The preset second distance may be equal to the preset first distance. Accordingly, the embodiments shown in FIG. 4 and FIG. 6 may be combined, that is, when the state parameter of the target object satisfies the second preset requirement, the embodiment shown in FIG. 6 is implemented, and when the state parameter of the target object satisfies the first preset, the embodiment shown in FIG. 4 is implemented.

In this embodiment, the above solution is implemented to control the flying altitude of the UAV by taking an image, which avoids the situation that the user must operate the control device to control the UAV, and overcomes the drawback that the user cannot control the UAV due to unfamiliarity with the control device. The control mode and operation process for controlling the UAV is simplified, the efficiency of controlling the UAV flight is improved, and the entertainment of human-machine interaction is enhanced.

FIG. 9 illustrates a fourth flowchart of a method for controlling a UAV according to some embodiment of the present disclosure. As shown in FIG. 9, the method in this embodiment takes controlling the UAV to fly around the target object based on the location of the hand as an example. The method in this embodiment may include:

S501: Obtaining an image captured by a photographing device.

S502: Determining a location of a target object's hand in the image.

S503: Determining location information of the target object's hand based on the location of the hand in the image.

For specific implementation processes of S501 to S503 in this embodiment, reference may be made to related descriptions in the embodiment shown in FIG. 2, and details are not described herein again.

S504: Determining an angle of the hand with respect to the target object in the yaw direction based on the location information of the target object's hand and the location information of the target object.

S505: Controlling the UAV to fly around the target object based on the angle.

In this embodiment, after determining the location information of the target object's hand, the angle of the hand with respect to the target object in the yaw direction is determined based on the location information of the target object's hand and the location information of the target object, then the expected angle of the UAV relative to the target object in the yaw direction is determined based on the above angle, and the UAV is controlled to fly around the target object to the expected angle. In some embodiments, after determining the location information of the target object's hand, the angle of the hand relative to the target object in the yaw direction is determined based on the location information of the target object's hand and the location information of the target object, expected location information of the UAV is determined based on the above angle, and then the UAV is controlled to fly around the target object to the expected location.

In an implementation manner, FIG. 10 is a first schematic diagram of controlling a UAV to fly around a target object according to some embodiment of the present disclosure. As shown in FIG. 10, based on the location information of the target object's hand and the location information of the target object, an angle of the target object's hand with respect to the target object in the yaw direction, $\beta 1$, is determined. In this embodiment, the angle $\beta 1$ can be set as the expected angle of the UAV with respect to the target object in the yaw direction. The UAV flies around the target object from the current position Pc4 to the expected position Pt4. When the UAV flies around to the expected position Pt4, the angle of the UAV relative to the target object in the yaw direction is $\beta 1$. The current angle of the UAV relative to the target object in the yaw direction is $\beta 2$. Since the expected angle of the UAV relative to the target object in the yaw direction is determined to be $\beta 1$, an angle of the UAV flying around the target object, $\Delta \beta = \beta 1 - \beta 2$, may be obtained. Based on FIG. 10, in this embodiment, the UAV may be controlled to fly around the target object until it is in the same yaw direction with respect to the target object as the target object's hand.

Figure 11:
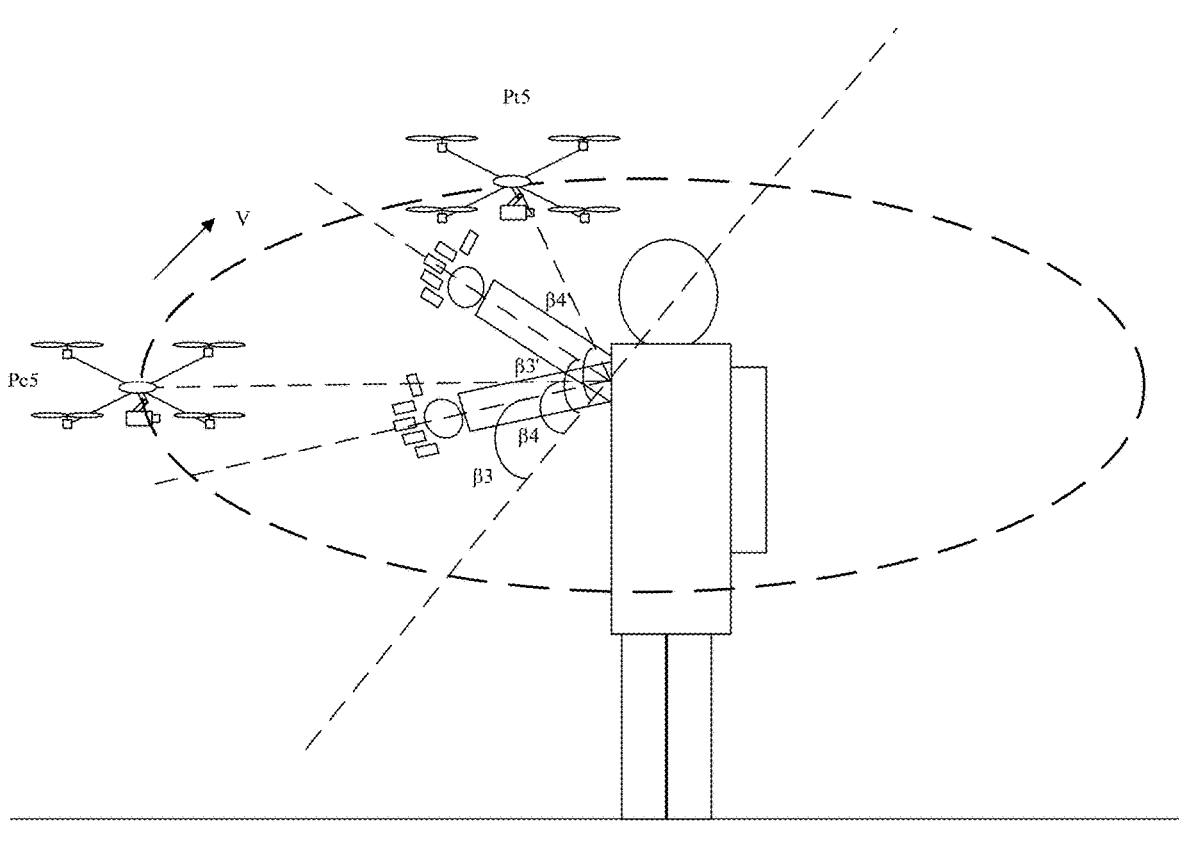
FIG. 11 is a second schematic diagram of controlling a UAV to fly around a target object according to some embodiment of the present disclosure.

In another implementation manner, the UAV can be controlled to fly around the target pair based on a movement of the hand. FIG. 11 is a second schematic diagram of controlling a UAV to fly around a target object according to some embodiment of the present disclosure. As shown in FIG. 11, an angle of the hand relative to the target object in the yaw direction before the movement, $\beta 3$, may be determined based on the location information of the target object's hand before the hand movement and the location information of the target object. An angle of target object's hand after the movement relative to the target object in the yaw direction, $\beta 3$, may be determined based on the location information of the target object's hand after the movement and the location information of the target object. Therefore, an angular change amount of the target object's hand with respect to the target object in the yaw direction is, $\Delta \beta = \beta 3' - \beta 3$. In this embodiment, the angular change amount $\Delta B$ can be set as the angle of the UAV flying around the target object. A current angle of the UAV relative to the target object in the yaw direction is $\beta 4$. The UAV flies around the target object from the current position Pc5 to the expected position Pt5. When the UAV flies to the expected position, Pt5, the angle of the UAV relative to the target object in the yaw direction is $\beta 4'$, where $\beta 4' = \beta 4 + \Delta \beta$. Based on FIG. 11, in this embodiment, the angle of the UAV flying around the target object can be controlled based on the angular change of the hand relative to the target object in the yaw direction. The direction in which the UAV flies around the target object may be the same as the direction in which the hand moves relative to the target object.

In this embodiment, the above solution is implemented to control the UAV to fly around the target object by taking an image, which avoids the situation that the user must operate a control device to control the UAV, and overcomes the drawback that the user cannot control the UAV due to unfamiliarity with the control device. The control mode and operation process for controlling the UAV may be simplified, thereby improving the efficiency of controlling the UAV and enhancing the entertainment of human-machine interaction.

Figure 12:
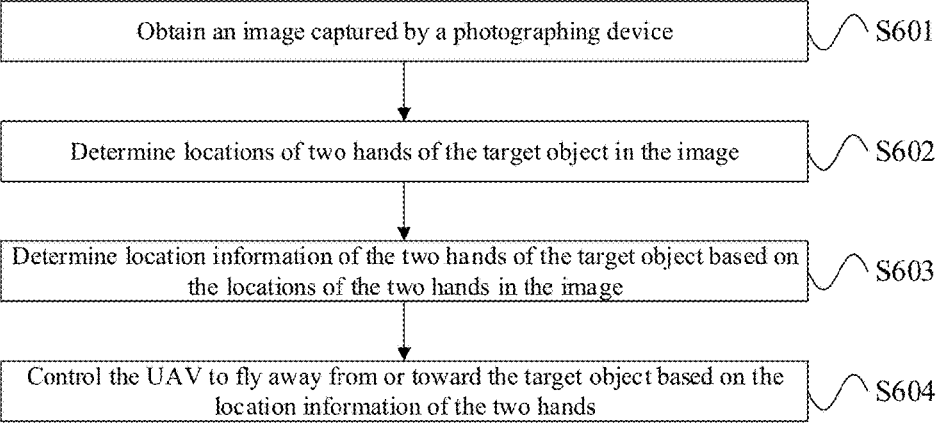
FIG. 12 is a fifth flowchart of a method for controlling a UAV according to some embodiment of the present disclosure.

FIG. 12 is a fifth flowchart of a method for controlling a UAV according to some embodiment of the present disclosure. As shown in FIG. 12, the method of this embodiment takes controlling the UAV to fly away from or toward a target object based on the location information of the hand as an example. The method in this embodiment may include:

S601: Obtaining an image captured by a photographing device.

For the specific implementation process of S601 to S603 in this embodiment, reference may be made to the related description in the embodiment shown in FIG. 2, and details are not described herein again.

S602: Determining locations of two hands of the target object in the image.

In this embodiment, the locations of the two hands (left and right) of the target object in the image are determined. Since the scheme of how to determine the location of the hand in the image has been described in the above embodiment, and accordingly, the determination of the location of each hand in the image, may be referred to the record of the above embodiment, which will not be described here.

S603: Determining location information of the two hands of the target object based on the locations of the two hands in the image.

After determining the locations of the two hands in the image, the location information of each hand is determined based on the location of each hand in the image. For the specific implementation process, reference may be made to the above embodiment to determine the target object based on the location of the hand in the image. The description of the location information of the hand is not repeated here.

S604: Controlling the UAV to fly away from or toward the target object based on the location information of the two hands.

In this embodiment, after determining the location information of the two hands of the target object, the UAV is controlled to fly away from or toward the target object based on the location information of the two hands. In this embodiment, the distance between the two hands may be determined based on the location information of the two hands. For example, the distance between the two hands may be the distance between the two hands in the horizontal direction; and the UAV is controlled to fly away from or toward the target object based on the above distance, e.g., the UAV may be controlled to fly away from or toward the target object along a direction connecting the UAV and the target object, or the UAV may be controlled to fly away from or toward the target object in the horizontal direction while maintaining the altitude of the UAV.

Figure 13:
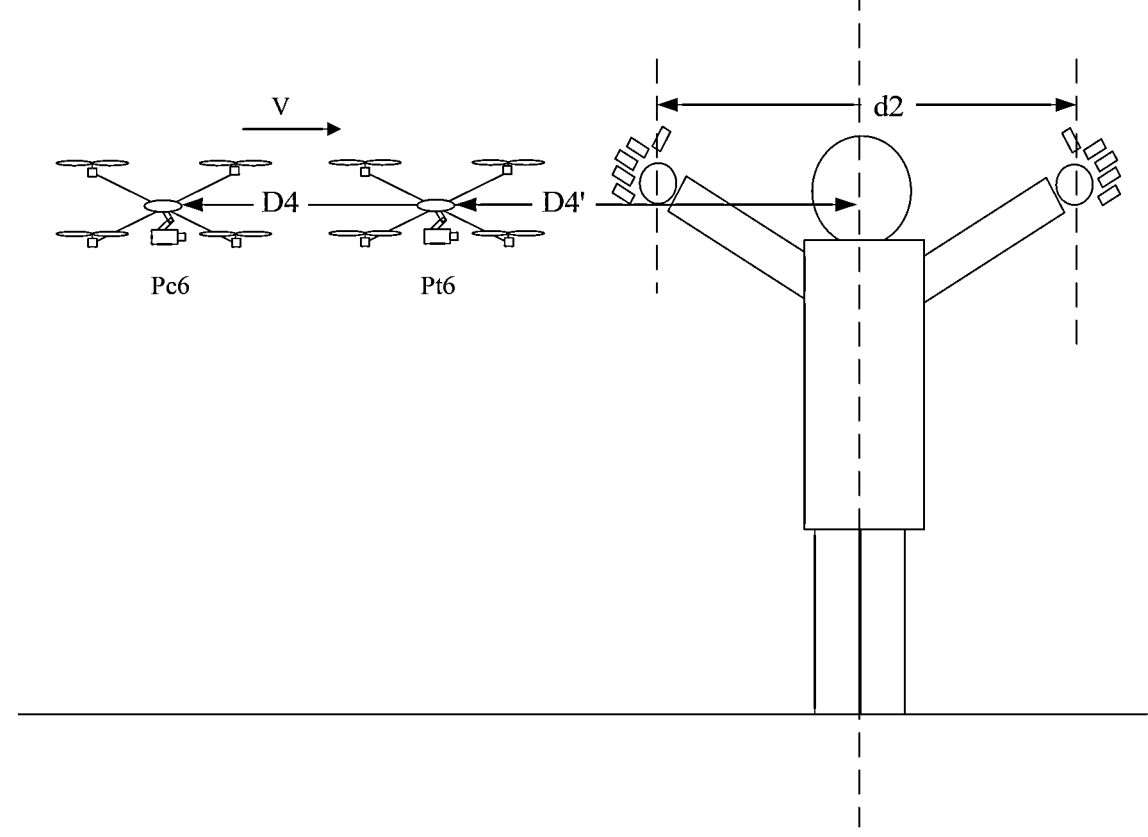
FIG. 13 is a first schematic diagram of controlling a UAV to fly away from or toward a target object according to some embodiment of the present disclosure.

In a possible implementation manner, FIG. 13 is a first schematic diagram of controlling a UAV to fly away from or toward a target object according to some embodiment of the present disclosure. As shown in FIG. 13, based on a distance between the two hands of the target object, d2, an expected distance, D4', between the UAV and the target object may be determined, where d2 and D4' satisfy a certain functional relationship, e.g., D4'=d2*C1, where C1 is a preset value. If a current distance D4 between the UAV and the target object is greater than the expected distance D4', a distance difference is, ΔD=D4−D4'. Accordingly, in this embodiment the UAV is controlled to fly a distance, ΔD, from the current location, Pc6, in a direction toward the target object to the expected location, Pt6. If the current distance D4 between the UAV and the target object is less than the expected distance D4', the distance difference ΔD=D4'−D4. Accordingly, in this embodiment the UAV is controlled to fly a distance, ΔD, away from the target object from the current position, Pc6, to the expected position, Pt6. FIG. 13 illustrates that the UAV flies toward the target object.

Figure 14:
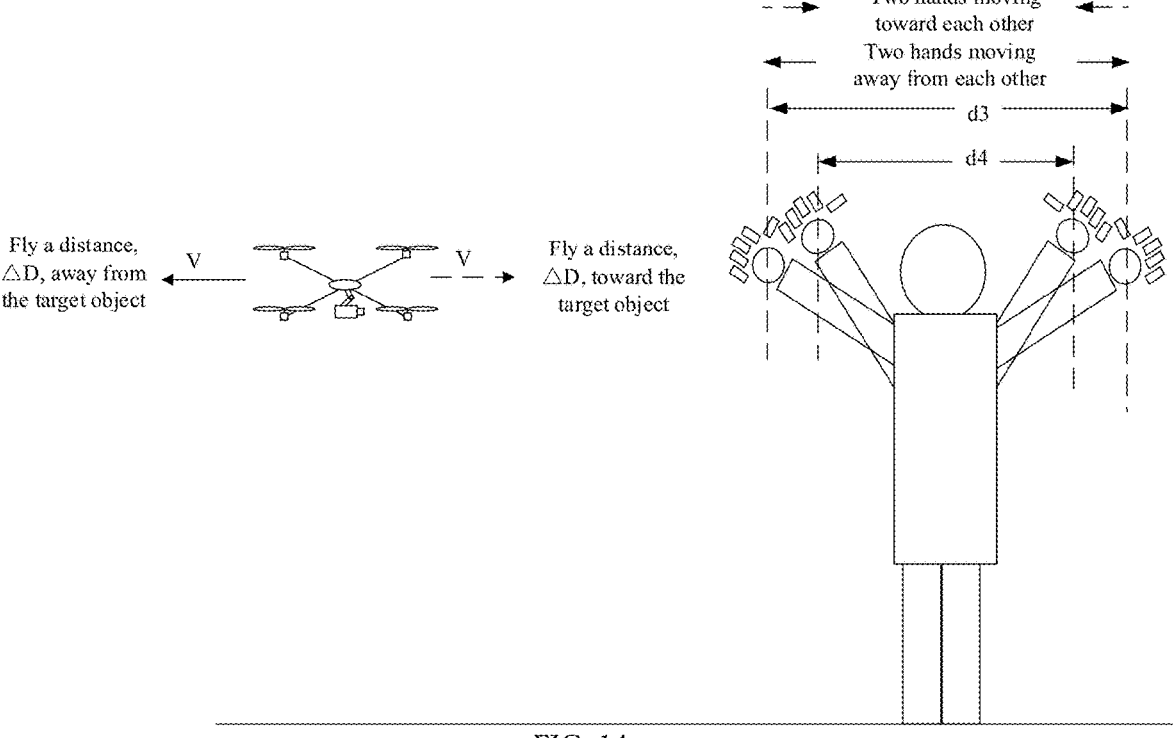
FIG. 14 is a second schematic diagram of controlling a UAV to fly away from or toward a target object according to some embodiment of the present disclosure.

In another implementation, the UAV can be controlled to fly away from or toward the target object based on relative movement of the two hands. FIG. 14 is a second schematic diagram of controlling a UAV to fly away from or toward a target object according to some embodiment of the present disclosure. As shown in FIG. 14, based on the location information of two hands of the target object before relative movement, the distance between the two hands before the relative movement is determined; and based on the location information of the two hands after the relative movement, the distance between the two hands after the relative movement is determined. If two hands move toward each other, the distance between the two hands decreases. As shown in FIG. 14, the distance between the two hands before the relative movement is d3, and the distance between the two hands after the relative movement is d4, and then based on d3 and d4, the change in the distance between the two hands Δd=d3−d4 may be determined; then the change in the distance between the UAV and the target object, ΔD, is determined based on the change in the distance between the two hands, Δd, where ΔD and Δd satisfy a certain functional relationship, e.g., ΔD=Δd*C2, C2 is a preset value. The UAV is then controlled to fly a distance, ΔD, toward the target object. If the two hands move away from each other, the distance between the two hands increases. As shown in FIG. 14, the distance between the two hands before the relative movement is d3, and the distance between the two hands after the relative movement is d4, and then based on d3 and d4, the change in the distance between the two hands Δd=d3−d4 may be determined; then the change in the distance between the UAV and the target object, ΔD, is determined based on the change in the distance between the two hands, Δd, where ΔD and Δd satisfy a certain functional relationship, e.g., ΔD=Δd*C2, C2 is a preset value. The UAV is then controlled to fly a distance, ΔD, away from the target object. In some embodiments, the UAV may be controlled to fly away from the target object when the distance between the two hands decreases, and the UAV may be controlled to fly toward the target object when the distance between the two hands increases.

In some embodiments, a maximum distance of the UAV away from the target object and a minimum distance of the UAV toward the target object may be limited. When the UAV is controlled to fly away from the target object, the distance between the UAV and the target object is also detected. If the distance is greater than or equal to the maximum distance, the UAV is controlled to stop flying away from the target object. When the UAV is controlled to fly toward the target object, the distance between the UAV and the target object is also detected. If the distance is less than or equal to the minimum distance, the UAV is controlled to stop flying toward the target object.

In this embodiment, the above solution is implemented to control the UAV to fly away from or toward the target object by capturing images, which avoids the situation that the user must operate the control device to control the UAV, and overcomes the drawback that the user cannot control the UAV due to unfamiliarity with the control device. The control mode and operation process for controlling the UAV is simplified, the efficiency of controlling the UAV flight is improved, and the entertainment of human-machine interaction is enhanced.

In some embodiments, based on the foregoing embodiments, a gesture of a hand of a target object in an image captured by a photographing device may be identified. Correspondingly, in this embodiment, one way of controlling the UAV based on the location information of the target object's hand is: In response to a gesture of the hand being a preset gesture, controlling the UAV based on the location information of the target object's hand. In response to the identified gesture of the target object's hand being a preset gesture, controlling the flying altitude of the UAV based on the location information of the target object's hand, controlling the UAV to fly around the target object, and controlling the UAV to fly away from or toward the target object, etc. The preset gestures are, for example, gestures such as ok, yeah, and extending a palm.

FIG. 15 is a sixth flowchart of a method for controlling a UAV according to some embodiment of the present disclosure. As shown in FIG. 15, the method in this embodiment may include:

S701: Obtaining an image captured by a photographing device.

In this embodiment, the specific implementation process of S701 may be referred to the related description in the embodiment shown in FIG. 2, and details are not described herein again.

S702: Determining a feature part of a target object in the image.

In this embodiment, the target object needs to be identified from the image, and the target object can be identified by identifying a feature part of the body of the target object. Therefore, a feature part of a target object in the image is determined from the image captured by the photographing device, and the feature part can be used to characterize the target object. When the target object is a human, the feature parts can be a human head, human head and shoulder, or at least one part of the human body.

In some embodiments, after entering the gesture control mode, the feature parts in the image may be identified first, and then the feature part of the target object may be determined from the feature parts in the image. In some cases, there may be multiple people in the captured image. When identifying the feature parts, the feature parts of these people may also be identified. Therefore, in this embodiment, the feature part of the target object needs to be determined from the feature parts in the image. The feature parts may be, e.g., a feature part closest to a center of the image may be set as the feature part of the target object, so that the target object can be closest to the center of the image. As such, after entering the gesture control mode, the feature parts of the target object can be found from the image. After finding the feature part of the target object in the image, when the photographing device obtains a new image, a tracking algorithm can be used to find the feature part of the target object from the new image. For example, a target image area is determined by the location of the feature part of the target object in the previous frame image, and in a target image area of the next frame image, an image area that is most similar to the feature part of the target object in the previous frame is found and set as a feature part of the target object in a next frame.

S703: Identifying a plurality of hands in the image.

In this embodiment, the hand in the image is also identified from the image captured by the photographing device. And S702 and S703 are performed in no particular order.

S704: Determining a target object's hand from the plurality of hands identified in the image based on the feature part of the target object.

In this embodiment, after determining a feature part of the target object in the image and identifying a plurality of hands in the image, the target object's hand is determined from the plurality of hands identified in the image based on the feature part of the target object. It is possible that there are multiple hands in the captured image, and these hands may also be identified when identifying the plurality of hands, but some of them are not the hands of the target object. Therefore, in this embodiment, the hand of the target object is determined from the image based on the feature part of the target object. In this embodiment, joint points of the target object can be determined based on the feature parts of the target object. These joint points include: joint points of the hand, joint points of the arm, joint points of the head, joint points of the shoulder. The target object's hand is further determined from the plurality of hands identified in the image based on the joint points of the target object. The joint points of the target object's hand can be determined among the joint points of the target object. In this embodiment, a hand closest to the joint point of the hand among the joint points of the target object in the plurality of hands identified in the image, may be determined, and then the hand closest to the joint point of the hand is determined as the hand of the target object.

S705: In response to the gesture of the target object's hand being a control gesture, controlling the UAV to perform an action indicated by the gesture.

In this embodiment, after identifying the target object's hand, when the gesture of the target object's hand is a control gesture, the UAV is controlled to perform an action indicated by the gesture, e.g., controlling the UAV to ascend or descend, controlling the flying altitude of the UAV, controlling the UAV to fly around the target object, controlling the UAV to fly away from or toward the target object, or take pictures or record videos, and so on. The control gestures are, e.g., gestures such as ok, yeah, extending a palm.

The controlling of the flying altitude of the UAV, the controlling of the UAV to fly around the target object, and the controlling of the UAV to fly away from or toward the target object, may be referred to the records in the foregoing embodiments.

The controlling of the UAV to ascend or descend is described as follows.

In some embodiments, when the gesture of the target object's hand is an ascending gesture, the ascending gesture is a control gesture, and the ascending gesture instructs the UAV to ascend. In this embodiment, the UAV is controlled to ascend based on the gesture being an ascending gesture. Optionally, in this embodiment, the UAV is controlled to ascend and fly at a preset altitude. As shown in FIG. 16, FIG. 16 is a schematic diagram of controlling ascending of a UAV according to some embodiment of the present disclosure. In some embodiments, a first user operation is detected after performing the above S701. After the first user operation detected, a gimbal that carries the photographing device drives the photographing device to scan within a preset angle range. A rotation of the gimbal drives a rotation of the photographing device, so that the photographing device scans within a preset angle range to capture an image within a preset angle range, thereby performing subsequent operations of S701 to S705. The first operation includes at least one of: clicking or double-clicking a battery switch, shaking the UAV, or issuing a voice instruction to the UAV. In this embodiment, the UAV enters a gesture recognition mode by these operations, and after the UAV enters the gesture recognition mode of the UAV, the gimbal that carries the UAV is controlled to drive the photographing device to scan within a preset angle range so as to recognize an ascending gesture of the target object.

In some embodiments, after the ascending gesture is identified, the UAV can to be controlled after the ascending gesture becomes a stable gesture. In this embodiment, when performing S701, multiple frames of images of the photographing device are obtained. After obtaining multiple frames of images, in this embodiment, also determines the location of the target object's hand in the image, for each frame of the multi-frame images. For how to determine the location of the target object's hand in the image, reference may be made to the foregoing embodiments, and the details are not described herein again. Then, when the target object's hand is in an ascending gesture, whether the location of the target object's hand in the image, for each frame image is within a preset range of a reference location, may be determined. If the location of the target object's hand in the image for each frame image is within the preset range of the reference location, it is indicated that the ascending gesture is a stable gesture and the target object is going to control the UAV to ascend, then in this embodiment, the UAV is controlled to ascend. If the location of the target object's hand in the image, for each frame of the image, is not within the preset range of the reference position, it is indicated that the ascending gesture is not a stable gesture, the target object is misoperating, and the UAV is not controlled to ascend. Then in this embodiment, the gesture is ignored, that is, the UAV is not controlled to ascend. In some embodiments, the reference location is the location of the target object's hand in a previous frame of the image, which also indicates that the location of the hand in each frame of the image is stable.

17
18

Figure 17:
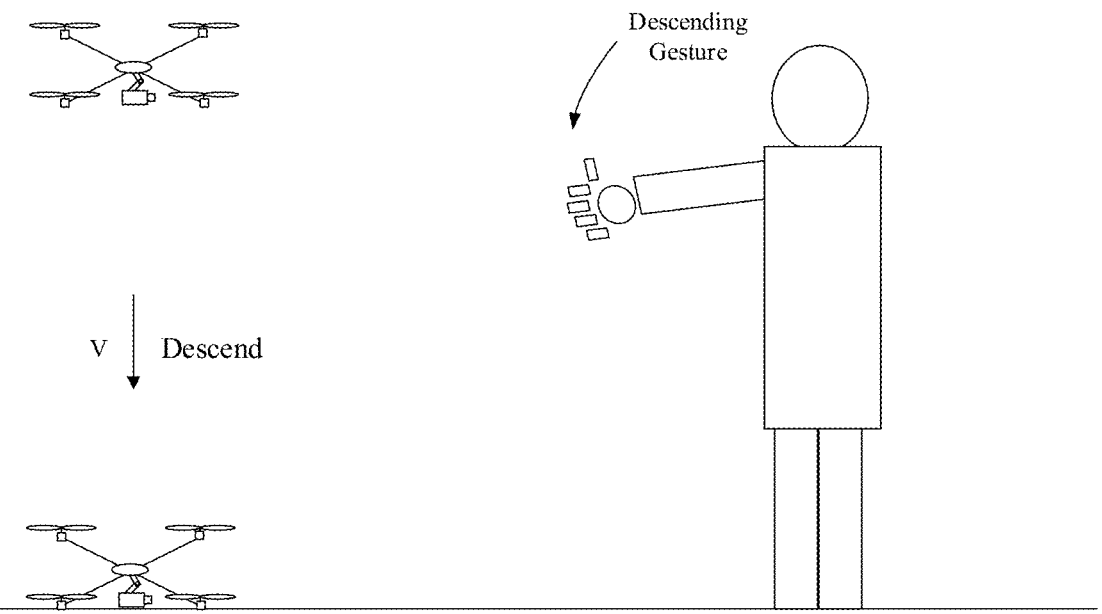
FIG. 17 is a schematic diagram of controlling descending of a UAV according to some embodiment of the present disclosure.

In some embodiments, when the gesture of the target object's hand is a descending gesture, the descending gesture is a control gesture, and the descending gesture instructs the UAV to descend. In this embodiment, the UAV is controlled to descend based on the gesture being a descending gesture. As shown in FIG. 17, FIG. 17 is a schematic diagram of controlling descending of a UAV according to some embodiment of the present disclosure.

In a first possible implementation manner, in this embodiment, further obtains an altitude measured by the distance sensor is further obtained. The altitude represents a flying altitude of the UAV. In this embodiment, whether the UAV can descend based on the altitude is also determined. The specific process is: when the gesture of the target object's hand is a descending gesture and the altitude value is less than or equal to a preset altitude threshold, control the UAV to descend. If the altitude is greater than the preset altitude threshold, it is indicated that the flying altitude of the UAV is high, and it is not suitable for the descending of the UAV in current situation. In order to ensure the safety of the UAV, when the altitude is greater than the preset altitude threshold, the descending gesture is ignored, that is, the UAV is not controlled to descend.

In a second possible implementation manner, in this embodiment, a flatness of a ground below the UAV is detected. The flatness can be detected by a binocular camera. In this embodiment, whether the UAV can descend based on the flatness can also be determined. The specific process is: when the gesture of the target object's hand is a descending gesture and the flatness is greater than or equal to a preset flatness threshold, control the UAV to descend. If the flatness is less than the preset flatness threshold, it is indicated that the ground below the UAV is not flat enough to ensure a safe landing of the UAV, so when the flatness is less than the preset flatness threshold, the descending gesture can be ignored, that is, the UAV is not controlled to descend.

In a third possible implementation manner, in this embodiment, whether a water surface exists under the UAV is also detected. In this embodiment, whether the UAV can descend can be determined based on whether a water surface exists below the UAV. The specific process is: when the gesture of the target object's hand is a descending gesture and the water surface does not exist below the UAV, control the UAV to descend. If there is a water surface below the UAV, the UAV may fall into the water after stopping on the water surface, which may cause damage to the UAV. Therefore, when there is a water surface below the UAV, descending gesture can be ignored, that is, the UAV is not controlled to descend.

In a fourth possible implementation manner, in this embodiment, the flying speed of the UAV is also detected, and the flying speed of the UAV can be detected by a speed sensor. In this embodiment, whether the UAV may descend is determined based on the flying speed of the UAV. The specific process is: when the gesture of the target object's hand is a descending gesture and the flying speed of the UAV is less than or equal to a preset speed threshold, control the UAV to descend. If the UAV's flying speed is greater than the preset speed threshold, in order to prevent the UAV from landing at a flying speed which may cause damage to the UAV, the descending gesture is ignored when the UAV's flight speed is greater than the preset speed threshold, that is, the UAV is not controlled to descend.

In a fifth possible implementation manner, in this embodiment, whether the altitude of the target object's hand is lower than an altitude of the target object's head is further detected. The altitude of the hand can be determined by the location information of the hand, and the altitude of the target object's head can be determined by the location information of the target object. For how to determine the location information of the hand and the location information of the target object, reference may be made to the related description in the foregoing embodiments, and details are not described herein again. In this embodiment, whether the UAV may descend can be determined based on the relationship between the altitude of the hand and the altitude of the head. The specific process is: when the gesture of the target object's hand is a descending gesture and the altitude of the target object's hand is lower than the altitude of the target's head, control the UAV to descend. If the gesture of the target object's hand is a descending gesture and the altitude of the target object's hand is not lower than the altitude of the head of the target object, the descending gesture is ignored, that is, the UAV is not controlled to descend.

It should be noted that at least two possible implementation manners of the first to fifth possible implementation manners described above may also be combined to control the descending of the UAV.

Figure 18:
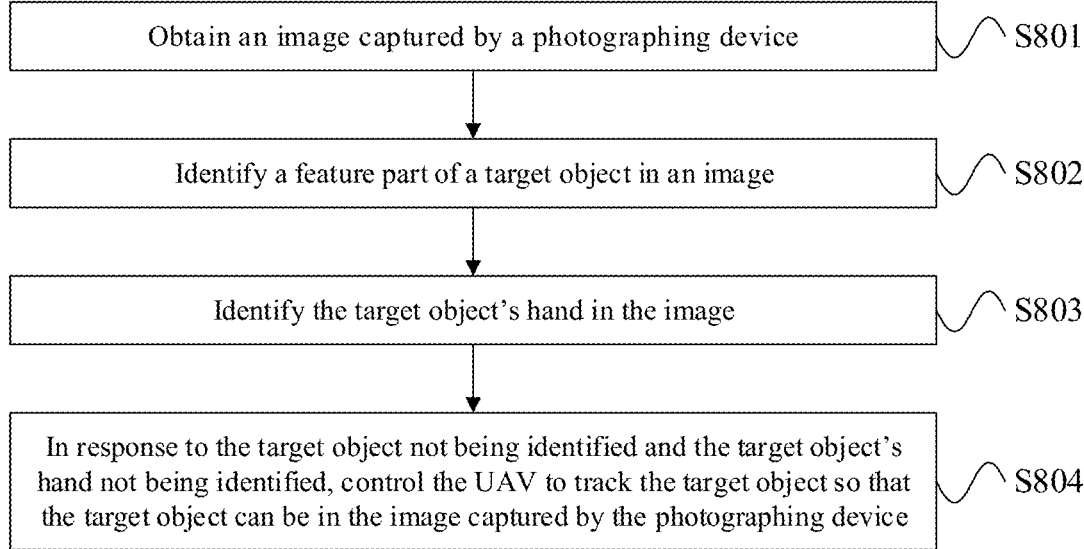
FIG. 18 is a seventh flowchart of a method for controlling a UAV according to some embodiment of the present disclosure.

FIG. 18 is a seventh flowchart of a method for controlling a UAV according to some embodiment of the present disclosure. As shown in FIG. 18, the method in this embodiment may include:

S801: Obtaining an image captured by a photographing device.

For the specific implementation process of S801 in this embodiment, reference may be made to the related description in the embodiment shown in FIG. 2, and details are not described herein again.

S802: Identifying a feature part of a target object in an image.

In this embodiment, for a specific implementation process of identifying a feature part of a target object in an image, reference may be made to the related description in the embodiment shown in FIG. 15, and details are not described herein again.

S803: Identifying the target object's hand in the image.

In this embodiment, for a specific implementation process of identifying a hand of a target object in an image, reference may be made to related descriptions in the embodiment shown in FIG. 15, and details are not described herein again. S802 and S803 are performed in no particular order.

S804: In response to the target object not being identified and the target object's hand not being identified, controlling the UAV to track the target object so that the target object can be in the image captured by the photographing device.

In this embodiment, when identifying the feature part through S802 and the feature part of the target object is identified, and when identifying the target object's hand through S803 and the target object's hand is not identified, it is indicated that the target object exists in the captured image but no hand exits, there is no need to control the UAV based on the hand, the UAV is then controlled to perform a handless following mode, that is, control the UAV to track the target object so that the photographing device can capture the target object, and the target subject is in the image captured by the photographing device.

In some embodiments, in order to make the target object in the image captured by the photographing device, in this embodiment, at least one of the location information, the attitude of the UAV, or the attitude of the gimbal that carries the photographing device may be adjusted to control the UAV to track the target object.

In some embodiments, the embodiment shown in FIG. 18 may be combined with any of the foregoing embodiments of FIGS. 2 to 15, that is, if the target object's hand is not identified, the solution of the embodiment shown in FIG. 18 is performed, and if the target object's hand is identified, the solution in any embodiment of FIG. 2 to FIG. 15 is performed.

In this embodiment, the above solution is implemented to control the UAV to follow the target object by taking an image, which avoids the situation that the user must operate a control device to control the UAV, and overcomes the drawback that the user cannot control the UAV due to unfamiliarity with the control device. The control mode and operation process for controlling the UAV may be simplified, thereby improving the efficiency of controlling the UAV and enhancing the entertainment of human-machine interaction.

In some embodiments, the feature parts in the foregoing embodiments may refer to at least one of a human head, a human head and shoulders, or a human body.

In some embodiments, when the state parameter of the target object satisfies a preset first state parameter condition, the feature part is a head and a shoulder of the human body. A preset first state parameter condition includes: a size ratio of the target object in the image is greater than or equal to a preset first ratio threshold, and/or, the distance between the target object and the UAV is less than or equal to the preset first distance. In this embodiment, it can be determined whether the size ratio of the target object in the image is smaller than the preset first ratio threshold. When the size ratio of the target object in the image is greater than or equal to the preset first ratio threshold, each of the above feature parts in the embodiments are the head and shoulders of the human body. The larger the proportion of the size of the target object in the image, the shorter the distance between the target object and the UAV is. It can also be determined whether the distance between the target object and the UAV is greater than the preset first distance. When the distance between the target object and the UAV is less than or equal to the preset first distance, the feature parts in the above embodiments are the head and shoulders of the human body. The distance between the target object and the UAV can be obtained by a binocular camera measuring distance. Therefore, when the state parameter of the target object satisfies the first preset requirement, it is indicated that the distance between the target object and the UAV is short and the target object is in a near-field state. At this time, the UAV can accurately identify the head and shoulders of the target object.

In some embodiments, when the state parameter of the target object satisfies a preset second state parameter condition, the feature part is a human body. A preset second state parameter condition includes: a target object's size ratio in the image is less than or equal to a preset second ratio threshold; and/or, the distance between the target object and the UAV is greater than or equal to the preset second distance. In this embodiment, it can be determined whether the size ratio of the target object in the image is greater than a preset second ratio threshold. When the size ratio of the target object in the image is less than or equal to the preset second ratio threshold, each of the above feature parts of the embodiment is a human body, and the smaller the size ratio of the target object in the image is, the longer the distance between the target object and the UAV is. It can also be determined whether the distance between the target object and the UAV is less than the preset second distance. When the distance between the target object and the UAV is greater than or equal to the preset second distance, the feature part of the above embodiments is the human body. Therefore, when the state parameter of the target object satisfies the second preset requirement, it is indicated that the distance between the target object and the UAV is long, and the target object is in a far-field state. At this time, the UAV can identify the human body of the target object.

In some embodiments, the above-mentioned preset first ratio threshold may be equal to the above-mentioned preset second ratio. That is, the preset first distance may be equal to the preset second distance.

In summary, in the embodiment of the present disclosure, the UAV can be controlled directly according to the hand in the image captured by the photographing device, including a series of processes such as taking-off, flying, hovering, flying away from or approaching, following, descending, etc. which avoids the situation that the user must operate a control device to control the UAV, and overcomes the drawback that the user cannot control the UAV due to unfamiliarity with the control device. The control mode and operation process for controlling the UAV may be simplified, thereby improving the efficiency of controlling the UAV and enhancing the entertainment of human-machine interaction.

An embodiment of the present disclosure also provides a computer storage medium. The computer storage medium stores program instructions. When the program is executed, the program may include a part, or all of the steps of the method for controlling a UAV in the foregoing embodiments.

Figure 19:
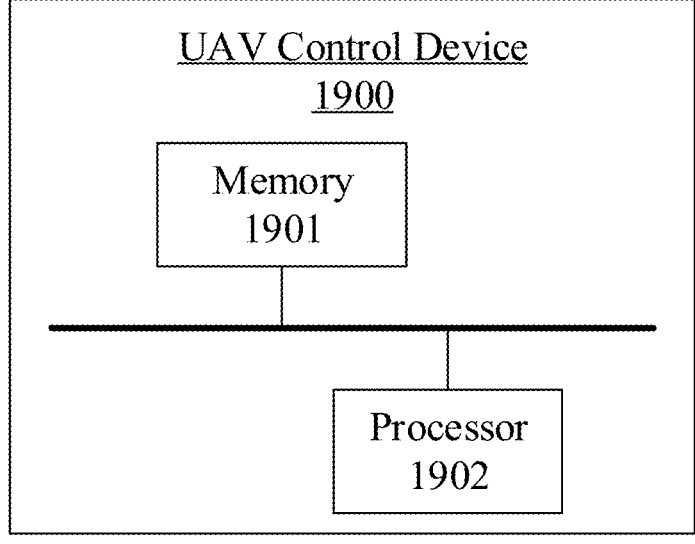
FIG. 19 is a schematic structural diagram of a UAV control device according to some embodiment of the present disclosure.

FIG. 19 is a schematic structural diagram of a UAV control device according to some embodiment of the present disclosure. As shown in FIG. 19, the UAV control device 1900 of this embodiment may include a memory 1901 and a processor 1902. The memory 1901 and the processor 1902 are connected through a bus. The memory 1901 may include a read-only memory and a random-access memory, and may provide instructions and data to the processor 1902. A part of the memory 1901 may further include a non-volatile random-access memory.

The above processor 1902 may be a Central Processing Unit (CPU), and the processor 1902 may also be other general-purpose processors, digital signal processor (DSP), and application-specific integrated circuit (ASIC), ready-made field-programmable gate array (FPGA) or other programmable logic devices, discrete gate or transistor logic device, discrete hardware component, etc. A general-purpose processor may be a microprocessor or any conventional processor, etc.

The memory 1901 is configured to store program code;

In some embodiments, the processor 1902 is configured to call the program code to execute:

Obtaining an image captured by a photographing device;

Determining a location of a target object's hand in the image;

Determining location information of the target object's hand based on the location of the hand in the image; and Controlling the UAV based on the location information of the target object's hand.

Optionally, the processor 1902 is specifically configured to determine the location information of the target object's hand based on the location of the hand in the image, the attitude of the gimbal that carries the photographing device, the horizontal distance between the target object and the UAV, and the location information of the UAV.

Optionally, the processor 1902 is specifically configured to determine the orientation of the hand relative to the UAV based on the location of the hand in the image and the attitude of the gimbal that carries the photographing device, and determine the location information of the target object's hand based on the above orientation, the horizontal distance between the target object and the UAV, and the location information of the UAV.

Optionally, the processor 1902 is specifically configured to control the flying altitude of the UAV based on the location information of the target object's hand.

Optionally, the processor 1902 is specifically configured to determine the angle of the hand with respect to the UAV in a pitch direction based on the location information of the target object's hand and the location information of the UAV and control the flying altitude of the UAV based on the above angle.

Optionally, the processor 1902 is specifically configured to: in response to the state parameter of the target object satisfying a first preset requirement, determine an angle of the hand relative to the UAV in the pitch direction based on the location of the target object's hand and location information of the UAV.

Optionally, the state parameter of the target object satisfying the first preset requirement includes: a size ratio of the target object in the image is greater than or equal to a preset first ratio threshold; and/or, the distance between the target object and the UAV is less than or equal to a preset first distance.

Optionally, the processor 1902 is specifically configured to: determine the angle of the hand with respect to the preset part in the pitch direction based on the location information of the preset part of the target object and the location information of the hand; and control the flying altitude of the UAV based on the above angle.

Optionally, the preset location includes at least one of: a head, a shoulder, or a chest.

Optionally, the processor 1902 is specifically configured to: in response to the state parameter of the target object satisfying the second preset requirement, determine an angle of the hand with respect to the feature part in the pitch direction based on the location information of the preset part of the target object and the location information of the hand.

Optionally, the state parameter of the target object satisfies the second preset requirement includes: a size ratio of the target object in the image is less than or equal to a preset second ratio threshold; and/or, the distance between the target object and the UAV is greater than or equal to a preset second distance.

Optionally, the location information of the preset part is determined based on the location information of the target object.

Optionally, the processor 1902 is specifically configured to Control the UAV to fly around the target object based on the location information of the target object's hand.

Optionally, the processor 1902 is specifically configured to: determine an angle of the hand with respect to the target object in a yaw direction based on the location information of the target object's hand and the location information of the target object; and control the UAV to fly around the target object based on the above angle.

Optionally, the processor 1902 is specifically configured to control the UAV to fly away from or toward the target object based on the location information of the target object's hand.

Optionally, the processor 1902 is specifically configured to: Determine locations of two hands of the target object in the image; determine location information of the two hands of the target object based on the locations of the two hands in the image; and control the UAV to fly away from or toward the target object based on the location information of the two hands.

Optionally, the processor 1902 is specifically configured to: determine a distance between the two hands based on the location information of the two hands; and control the UAV to fly away from or toward the target object based on the above distance.

Optionally, the processor is further configured to: determine a location of the target object in the image; and determine the location information of the target object based on the location of the target object in the image.

Optionally, the processor 1902 is specifically configured to determine the location information of the target object based on the location of the target object in the image, the attitude of the gimbal that carries the photographing device, the horizontal distance between the target object and the UAV, and the location information of the UAV.

Optionally, the processor 1902 is further configured to: identify a gesture of a target object's hand in an image.

When the processor controls the UAV based on the location information of the target object's hand, the processor is specifically configured to: in response to the gesture of the hand being a preset gesture, control the UAV based on the location information of the target object's hand.

The device in this embodiment may be configured to implement the technical solutions of FIG. 2 to FIG. 12 and the corresponding embodiments. The implementation principles and technical effects are similar, and details are not described herein again.

In some embodiments, the processor 1902 is configured to call the program code to execute:

Obtaining an image captured by a photographing device;

Determining a feature part of a target object in the image;

Identifying a plurality of hands in the image; and

Determining a target object's hand from the plurality of hands identified in the image based on the feature part of the target object;

When the gesture of the target object's hand is a control gesture, the UAV is controlled to perform the action indicated by the gesture.

Optionally, the processor 1902 is specifically configured to: in response to the gesture being a take-off gesture, control the UAV to ascend.

Optionally, the processor 1902 is specifically configured to control the UAV to ascend and fly at a preset altitude.

Optionally, the processor 1902 is further configured to: after detecting the first operation of the user, control the gimbal that carries the photographing device to drive the photographing device to scan within a preset angle range.

Optionally, the first operation includes at least one of: clicking or double-clicking a battery switch, shaking the UAV, or issuing a voice instruction to the UAV.

Optionally, the processor 1902 is specifically configured to: obtain multiple frames of images captured by the photographing device; determine the location of the target object's hand in the image for each frame of the multi-frame images;

When the gesture of the target object is a take-off gesture and the location of the target object's hand in the image for each frame is within a preset range of a reference location, the UAV is controlled to ascend.

Optionally, the reference location is a location of the target object's hand in the image in a previous frame.

Optionally, the processor 1902 is specifically configured to control the UAV to descend in response to the gesture being a descending gesture.

Optionally, the processor 1902 is further configured to obtain an altitude measured by a distance sensor.

The processor 1902 is configured to control the descending of the UAV when the gesture is a descending gesture, including: the processor is configured to control the UAV to descend when the gesture is a descending gesture and the altitude value is less than or equal to a preset altitude threshold.

Optionally, the processor 1902 is further configured to detect a flatness of the ground below the UAV.

The processor 1902 is configured to control the descending of the UAV when the gesture is a descending gesture, including: the processor 1902 is configured to control the UAV to descend when the gesture is a descending gesture and the flatness is greater than or equal to a preset flatness threshold.

Optionally, the processor 1902 is further configured to detect whether a water surface exists under the UAV.

The processor 1902 is configured to control the descending of the UAV when the gesture is a descending gesture, including: the processor 1902 is configured to control the UAV to descend when the gesture is a descending gesture and there is no water surface below the UAV.

Optionally, the processor 1902 is further configured to detect a flying speed of the UAV.

The processor 1902 is configured to control the descending of the UAV when the gesture is a descending gesture, including: the processor 1902 is configured to control the UAV to descend when the gesture is a descending gesture and the speed is less than or equal to a preset speed threshold.

Optionally, the processor 1902 is specifically configured to: identify feature parts in the image; and determine a feature part of the target object from the feature parts identified in the image.

Optionally, the processor 1902 is specifically configured to determine a feature part of the target object from the feature parts closest to a center of the image.

Optionally, the processor 1902 is specifically configured to: determine a joint point of the target object based on a feature part of the target object; and determine the target object's hand from the plurality of hands identified in the image based on the joint point of the target object.

Optionally, the processor 1902 is specifically configured to: determine the target object's hand closest to the joint point of the hand among the joint points of the target object from the plurality of hands identified in the image; and determine the hand closest to the joint point of the hand is as the target object's hand.

Optionally, the feature part includes at least one of: a human head, a human head and shoulders, or a human body.

Optionally, when the state parameter of the target object satisfies a preset first state parameter condition, the feature part is the head and shoulders of a human.

Optionally, the preset first state parameter condition includes: a size ratio of the target object in the image is greater than or equal to a preset first ratio threshold, and/or, the distance between the target object and the UAV is less than or equal to the preset first distance.

Optionally, when the state parameter of the target object satisfies a preset second state parameter condition, the feature part is the human body.

Optionally, the preset second state parameter condition includes: a size ratio of the target object in the image is less than or equal to a preset second ratio threshold, and/or, the distance between the target object and the UAV is greater than or equal to the preset second distance.

The device in this embodiment may be configured to implement the technical solution of FIG. 15 and the corresponding embodiments. The implementation principles and technical effects are similar, and details are not described herein again.

In some embodiments, the processor 1902 is configured to call the program code to execute:

Obtaining an image captured by a photographing device;

Identifying a feature part of a target object in the image;

Identifying a hand of the target object in the image; and

In response to the feature part of the target object being identified and the target object's hand being not identified, controlling the UAV to track the target object so that the target object is in the image captured by the photographing device.

Optionally, the processor 1902 is specifically configured to adjust at least one of: the location information of the UAV, a posture of the UAV, or a posture of a gimbal carrying the photographing device to track the target object so that the target object is in the image captured by the photographing device.

Optionally, the feature part includes at least one of: a human head, a human head and shoulders, or a human body.

Optionally, when the state parameter of the target object satisfies a preset first state parameter condition, the feature part is a head and shoulders of a human.

Optionally, a preset first state parameter condition includes: a size ratio of the target object in the image is greater than or equal to a preset first ratio threshold, and/or, the distance between the target object and UAV is less than or equal to the preset first distance.

Optionally, when the state parameter of the target object satisfies a preset second state parameter condition, the feature part is the human body.

Optionally, a preset second state parameter condition includes: a size ratio of the target object in the image is less than or equal to a preset second ratio threshold, and/or, the distance between the target object and the UAV is greater than or equal to the preset second distance.

The device in this embodiment may be configured to implement the technical solution in FIG. 18 and the corresponding embodiments. The implementation principles and technical effects are similar, and details are not described herein again.

Figure 20:
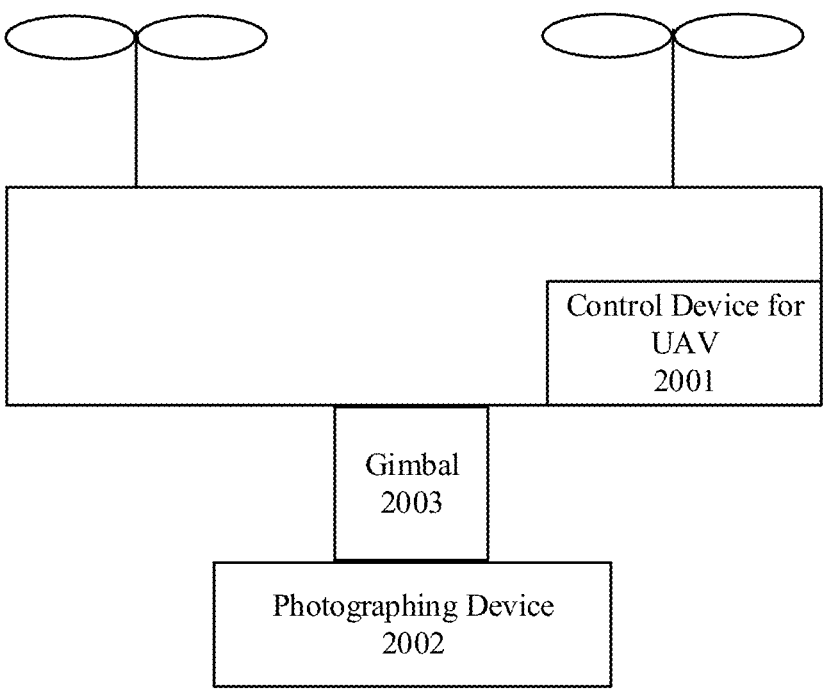
FIG. 20 is a second schematic diagram of a UAV according to some embodiment of the present disclosure.

FIG. 20 is a schematic structural diagram of a UAV according to some embodiment of the present disclosure. As shown in FIG. 20, the UAV of this embodiment may include: a control device 2001, a photographing device 2002, and a power system (Not shown). The control device 2001 of the UAV is connected to the power system through a bus. The UAV control device 2201 is configured to control the UAV. The structure of the embodiment shown in FIG. 19 may be implemented. Correspondingly, any method embodiment and corresponding implementations in FIG. 2 to FIG. 18 may be performed. The technical solution of this embodiment has similar implementation principles and technical effects, and are not described herein again. The photographing device 2002 is configured to record images. The power system is configured to supply flying power and power to drive the UAV. The power system includes an ESG, a motor, and propellers. In some embodiments, the UAV may further include a gimbal 2003, which is configured to carry a photographing device 2002. In some embodiments, the UAV may further include: a location sensor, a distance sensor, and a speed sensor.

Those of ordinary skill in the art may understand that all or part of the steps to implement the foregoing method embodiments may be completed by a related hardware instructed by a program. The program may be stored in a computer-readable storage medium, and when executed, the steps in the above embodiments are performed. The foregoing storage medium includes: a read-only memory (ROM), a random-access memory (RAM), a magnetic disk or an optical disk, and various medium that can store program codes.

Finally, it should be noted that the above embodiments are only used to illustrate the technical solutions of the present disclosure, but not limited thereto. Although the present disclosure has been described in detail with reference to the foregoing embodiments, those skilled in the art should understand: the technical solutions described in the foregoing embodiments can still be modified, or some or all of the technical features can be equivalently substituted; and these modifications or substitutions do not cause the corresponding technical solutions to depart from the range of the technical solutions of the embodiments of the present disclosure.

What is claimed is:

1. A control method comprising:
obtaining an image captured by a photographing device;
determining a location of a target part of a target object in the image;
controlling, based on at least the location of the target part, an unmanned aerial vehicle (UAV) to fly to an expected altitude with a non-zero horizontal distance with the target part of the target object, the expected altitude being an altitude at which the target part is located; and
in response to a detected landing command, controlling the UAV to initiate a landing process.

2. The control method according to claim 1, further comprising:
determining location information of a hand of the target object based on a location of the hand in the image;
wherein controlling the UAV to initiate the landing process includes controlling the UAV to land based on the location information of the hand of the target object.

3. The control method according to claim 2, wherein determining the location information of the hand of the target object includes:
determining an orientation of the hand relative to the UAV based on the location of the hand in the image and an attitude of a gimbal that carries the photographing device; and
determining the location information of the hand of the target object based on the orientation, a horizontal distance between the target object and the UAV, and location information of the UAV.

4. The control method according to claim 1, wherein controlling, based on at least the location of the target part, the UAV to fly to the expected altitude includes:
determining an angle of the target part with respect to the UAV in a pitch direction based on the location of the target part of the target object and location information of the UAV; and
controlling the UAV to fly to the expected altitude based on the angle.

5. The control method according to claim 4, wherein determining the angle of the target part with respect to the UAV in the pitch direction based on the location of the target part of the target object and the location information of the UAV includes:
in response to a state parameter of the target object satisfying a first preset requirement, determining the angle of the target part with respect to the UAV in the pitch direction based on the location of the target part of the target object and the location information of the UAV.

6. The control method according to claim 5, wherein the state parameter of the target object satisfying the first preset requirement includes:
a size ratio of the target object in the image being greater than or equal to a preset first ratio threshold; and
a distance between the target object and the UAV being less than or equal to a preset first distance.

7. The control method according to claim 1, wherein controlling, based on at least the location of the target part, the UAV to fly to the expected altitude includes:
determining an angle of the target part with respect to a preset part of the target object in a pitch direction based on location information of the preset part of the target object and the location of the target part; and
controlling the UAV to fly to the expected altitude based on the angle.

8. The control method according to claim 7, wherein determining the angle of the target part with respect to the preset part in the pitch direction based on the location information of the preset part of the target object and the location of the target part includes:
in response to a state parameter of the target object satisfying a second preset requirement, determining the angle of the target part with respect to a feature part in the pitch direction based on the location information of the preset part of the target object and the location of the target part.

9. The control method according to claim 7, wherein the location information of the preset part is determined based on location information of the target object.

10. The control method according to claim 1, further comprising:
controlling the UAV to fly away from or toward the target object based on a location of a hand of the target object.

11. The control method according to claim 1, further comprising:
determining location information of the target object based on a location of the target object in the image, an attitude of a gimbal that carries the photographing device, a horizontal distance between the target object and the UAV, and location information of the UAV.

12. The control method according to claim 1, further comprising:
determining an angle of a hand of the target object with respect to the target object in a yaw direction based on a location of the hand and a location of the target object;
determining an expected angle of the UAV relative to the target object in the yaw direction based on the angle; and
controlling the UAV to fly around the target object at a fixed distance to the target object according to the expected angle.

13. The control method according to claim 1, wherein controlling the UAV to initiate the landing process includes:
controlling the UAV to fly in an altitude direction based on the location of the target part of the target object.

14. The control method according to claim 1, wherein in response to the detected landing command, controlling the UAV to initiate the landing process includes:
detecting a gesture of a hand of the target object; and
in response to detecting that a gesture of the hand is a palm-extending gesture, controlling the UAV to initiate the landing process, including:

in response to detecting that the gesture of the hand is the palm-extending gesture and a flatness of a landing surface below the UAV being greater than or equal to a preset flatness threshold, controlling the UAV to land based on the location of the target part of the target object;

in response to detecting that the gesture of the hand is the palm-extending gesture and a flying speed of the UAV being less than or equal to a preset speed threshold, controlling the UAV to land based on the location of the target part of the target object; or in response to detecting that the gesture of the hand is the palm-extending gesture and an altitude of the hand of the target object being lower than an altitude of a head of the target object, controlling the UAV to land based on the location of the target part of the target object.

15. The control method according to claim 14, further comprising:

in response to detecting that the gesture of the hand is the palm-extending gesture and the flatness of the landing surface below the UAV being less than the preset flatness threshold, controlling the UAV to cease descending;

in response to detecting that the gesture of the hand is the palm-extending gesture and the flying speed of the UAV being greater than the preset speed threshold, controlling the UAV to cease descending; or in response to detecting that the gesture of the hand is the palm-extending gesture and the altitude of the hand of the target object being not lower than the altitude of the head of the target object, controlling the UAV to cease descending.

16. The control method according to claim 1, further comprising:

in response to the target object being identified and the hand of the target object not being identified, controlling the UAV to track the target object to cause the target object to be maintained in images captured by the photographing device.

17. The control method according to claim 1, wherein the target part is a hand of the target object.

18. The control method according to claim 1, further comprising:

in response to a distance between the UAV and the target object being greater than or equal to a maximum distance, controlling the UAV to stop flying away the target object; or in response to the distance between the UAV and the target object being less than a minimum distance, controlling the UAV to stop flying toward the target object.

19. A control device for an unmanned aerial vehicle (UAV), comprising:

a memory storing program code, and a processor configured to execute the program code, when executed, the program code instructing the processor to:

obtain an image captured by a photographing device;

determine a location of a target part of a target object in the image;

control, based on at least the location of the target part, the UAV to fly to an expected altitude with a non-zero horizontal distance with the target part, the expected altitude being an altitude at which the target part is located; and in response to a detected landing command, control the UAV to initiate a landing process.

20. An unmanned aerial vehicle (UAV) comprising:

a memory storing program code, and a processor configured to execute the program code, when executed, the program code instructing the processor to:

obtain an image captured by a photographing device;

determine a location of a target part of a target object in the image;

control, based on at least the location of the target part, the UAV to fly to an expected altitude with a non-zero horizontal distance with the target part, the expected altitude being an altitude at which the target part is located; and in response to a detected landing command, control the UAV to initiate a landing process.

* * * * *